United States Patent [19]

O'Neal, Jr.

[11] 3,832,518

[45] Aug. 27, 1974

[54] WELDING CONTROL APPARATUS

[75] Inventor: George O'Neal, Jr., Plymouth, Mich.

[73] Assignee: Weltronic Company, Southfield, Mich.

[22] Filed: July 24, 1970

[21] Appl. No.: 58,126

[52] U.S. Cl. ............................................. 219/110
[51] Int. Cl. ............................................. B23k 9/10
[58] Field of Search ........................... 219/108–110, 219/114; 323/22, 24 V, 24 SC, 102; 328/70, 71, 72, 78, 81, 84

[56] References Cited
UNITED STATES PATENTS

| 2,234,963 | 3/1941 | Coffin | 219/114 X |
| 2,866,134 | 12/1958 | Hartwig | 219/114 |
| 2,985,816 | 5/1961 | Scholtes et al. | 219/114 |
| 3,005,947 | 10/1961 | Scholtes et al. | 323/58 |
| 3,202,871 | 8/1965 | Shelar | 219/131 |
| 3,243,689 | 3/1966 | Perrins | 323/22 SC |
| 3,452,283 | 6/1969 | O'Neal, Jr. | 219/114 X |
| 3,486,042 | 12/1969 | Waltrous | 323/22 SC |

FOREIGN PATENTS OR APPLICATIONS

| 637,644 | 5/1950 | Great Britain | 323/102 |

Primary Examiner—J. V. Truhe
Assistant Examiner—Clifford C. Shaw
Attorney, Agent, or Firm—Harness, Dickey & Pierce

[57] ABSTRACT

A firing control system for controlling controllable rectifier devices to control the transfer of energy from a source of energy to a workpiece to be welded and for establishing controlled firing sequences and times.

119 Claims, 11 Drawing Figures

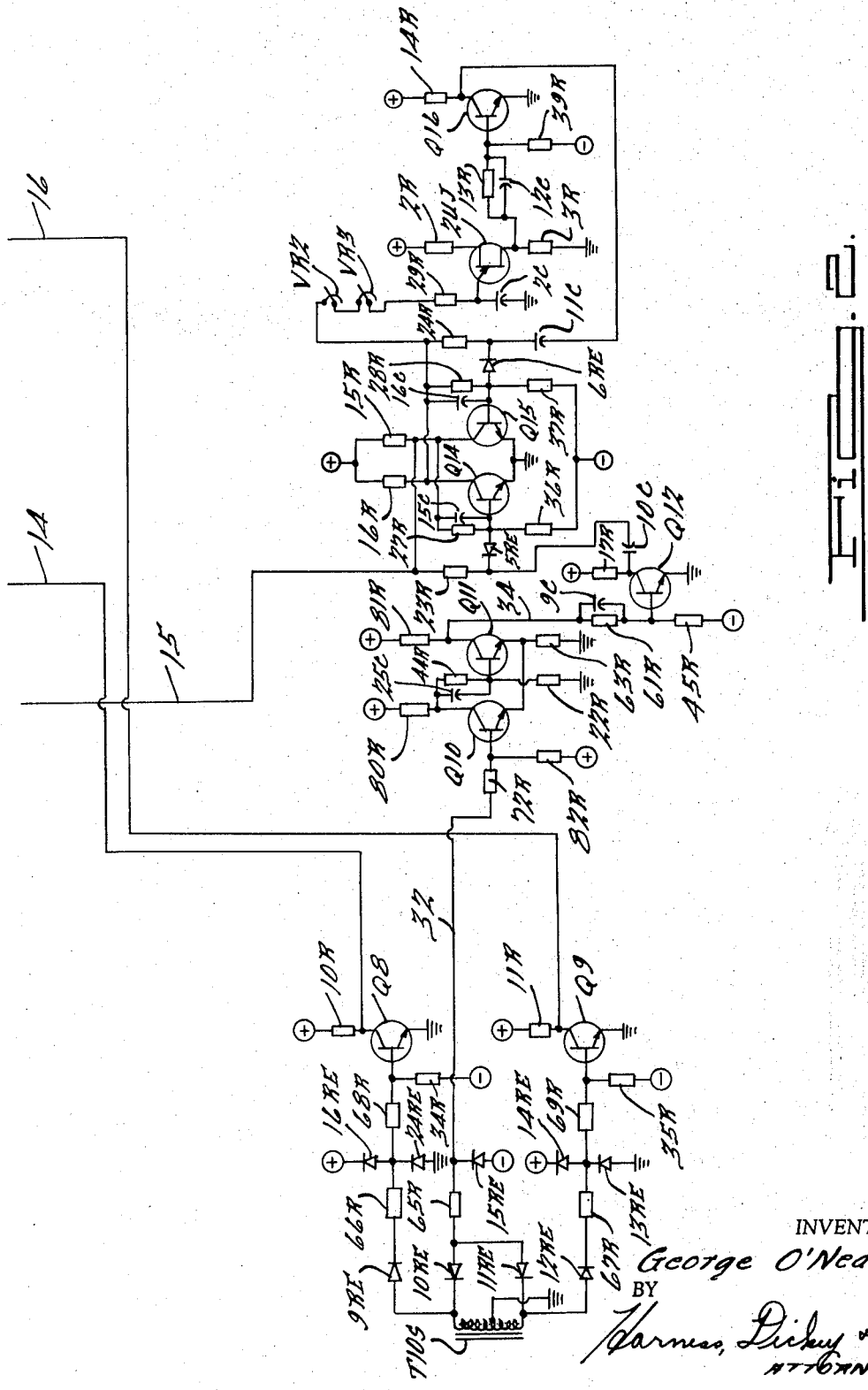

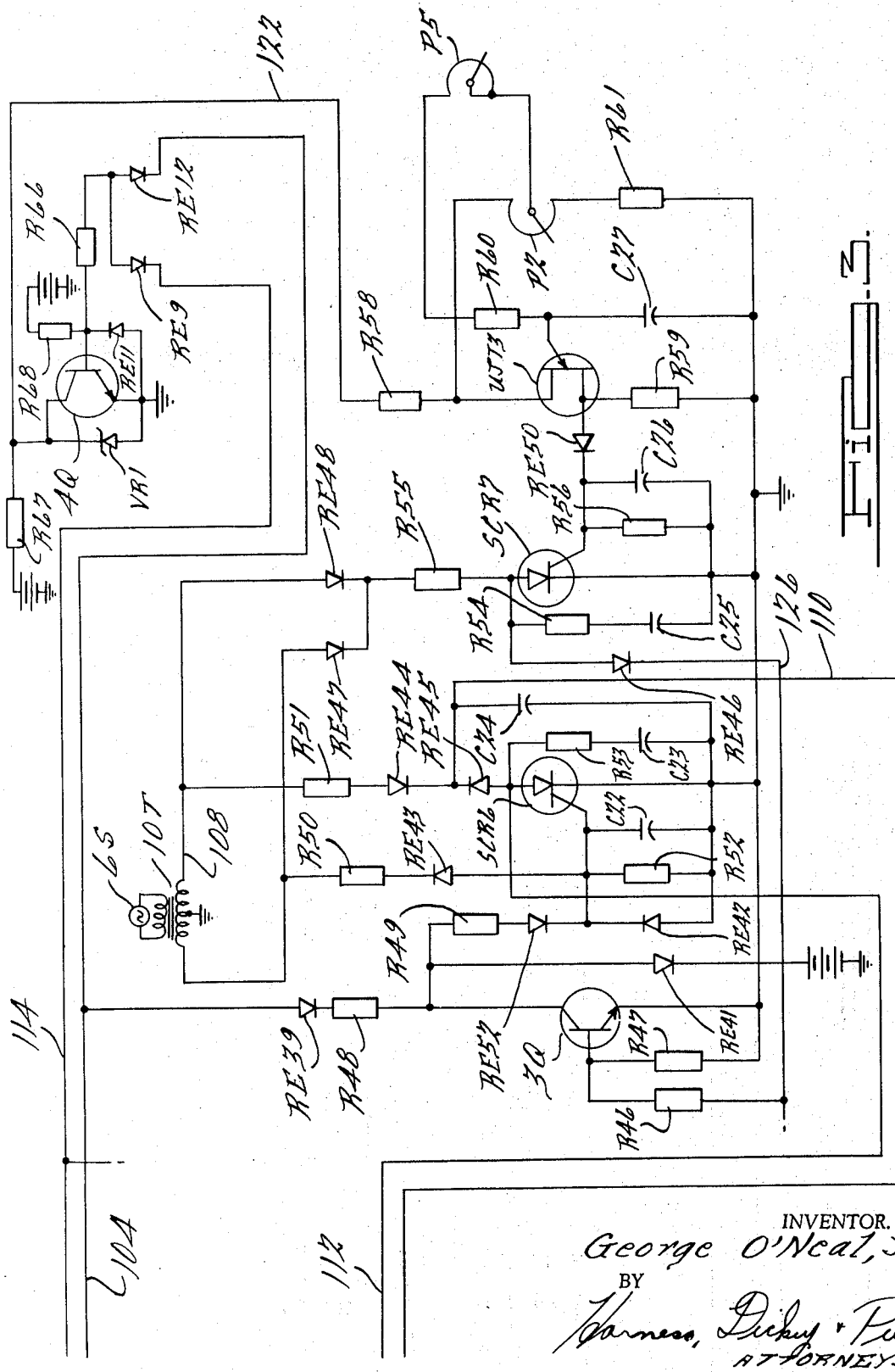

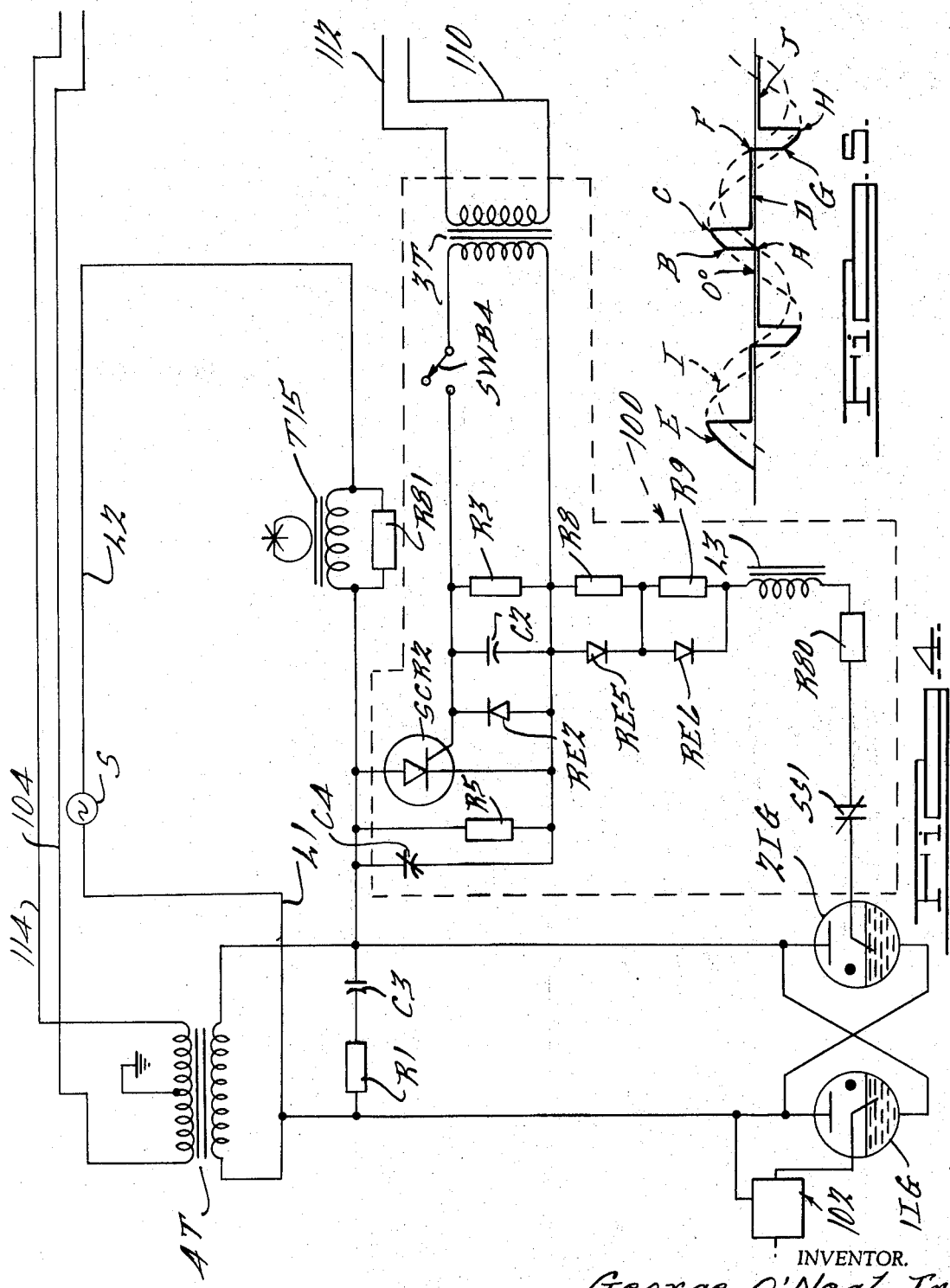

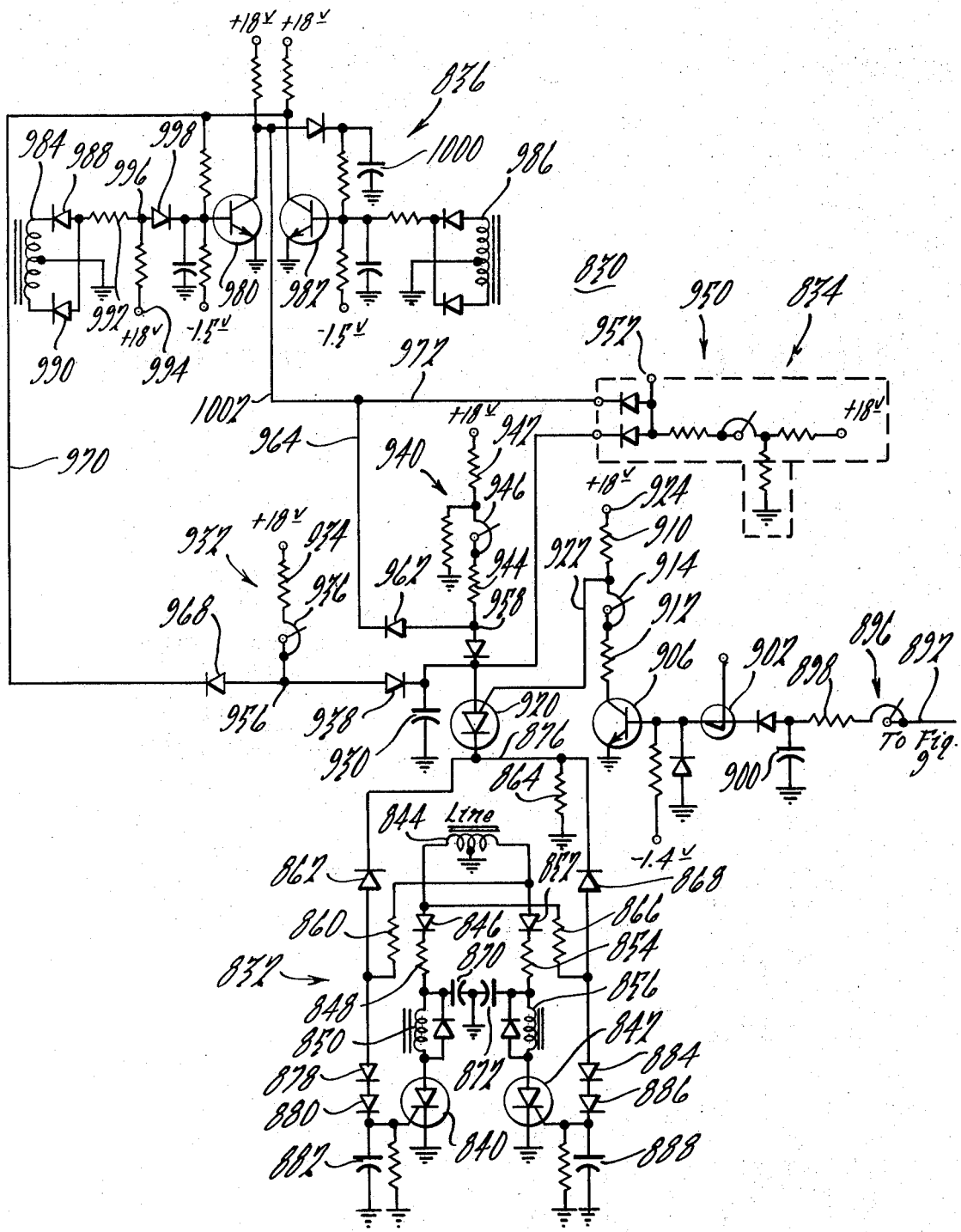

WELDING CONTROL APPARATUS

BACKGROUND AND SUMMARY OF THE DISCLOSURE

This invention relates to control apparatus and more particularly to a firing system suitable for use in conjunction with ignitrons or similar controlled rectifier devices to control transfer of energy from an energy source to a workpiece to be welded.

In general, the system preferably employs, in substantial part, solid-state devices and certain of the features of the invention are directed to the solution of the problems that arise as a result of the effort to obtain the known advantages of solid-state devices.

An object of this invention is to improve solid-state firing systems for ignitrons or the like.

Another object of this invention is to improve separate-excitation firing circuits.

Another object of the invention is to prevent line voltage transients from adversely affecting the operation of a firing system including solid-state devices.

Another object of this invention is to increase the safety of operation of firing circuits for ignitrons and the like.

Another object of this invention is to disable a firing circuit to fire an ignitron or the like in a welding system until a preselected period has elapsed following the receipt of an initiating signal.

Another object of the invention is to improve circuits for establishing the proper sequence and alternation of operation of a pair of back-to-back connected contactor devices.

Another object of the invention is to establish in a precise and selectable interval between the instant of initiation of a weld interval and the time at which welding current can first be delivered to the workpiece.

Another object of this invention is to improve the accuracy of timing a heat control apparatus.

Another object of the invention is to increase the effective range of control of a heat control apparatus.

A further object of the invention is to insure proper operation of a separate-excitation firing system when utilized in conjunction with a resistance welder operating with an inductive load.

Another object of the invention is to prevent the separate-excitation firing system from prematurely firing control ignitrons or the like.

Another object of this invention is to disable a separateexcitation system from energizing the input circuit of an ignitron or the like until the anode voltage of that ignitron has appropriately changed.

A further object of this invention is to automatically adjust for power factor in a resistance welding system.

The manner in accomplishing the foregoing objects and other objects and features of this invention may be perceived from the following detailed description of an embodiment of the invention when read with reference to the accompanying drawings, in which:

FIG. 2 is a schematic representation of another portion of the circuit of FIG. 1 and should be placed below FIG. 1 for proper orientation;

FIG. 3 is a schematic representation of a portion of an electrical control circuit embodying certain of the principles of the present invention;

FIG. 4 is a schematic representation of another portion of the electrical control circuit of FIG. 3;

FIG. 5 is a graphical representation of certain electrical relationships which can exist in the circuit of FIGS. 3 and 4;

FIG. 11 is a schematic representation of another portion of the electrical control circuit of FIG. 7.

Figure 1:
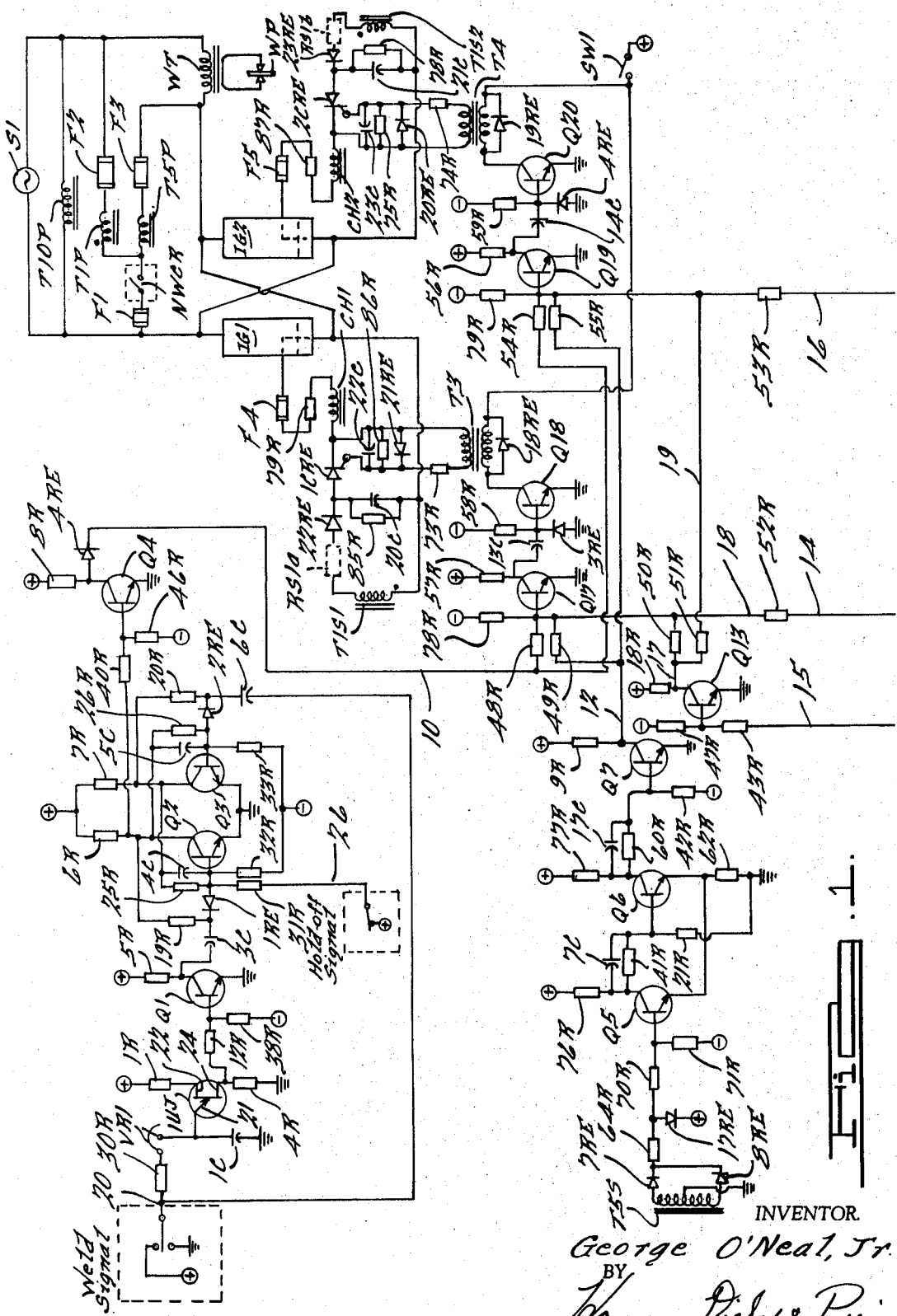
FIG. 1 is a schematic representation of a portion of an electrical control circuit embodying certain of the principles of the present invention.

For convenience of illustration, the transformer windings have been illustrated in the drawings in a way to best illustrate the functions of those transformers and consequently the primary and secondary windings are shown separated. Common prefix designations have been employed in each case, however, to permit identification of which secondary windings are associated with which primary windings. Additionally, in the drawings, the sources of direct voltage have been indicated by a circle bearing a sign indicative of the polarity of the source. It is to be understood that in each case the other terminal of the source is assumed to be connected to ground. For convenience and clarity, voltage values have been referred to in the following description. It is to be understood that they are but representative.

In general, the circuits illustrated on FIGS. 1 and 2 of the drawings comprise a pair of ignitrons IG1 and IG2 (or other controlled contactor means) for selectively connecting a source of energy S1 to a welding transformer WT for controlling the application of energy to a workpiece WP which is to be welded. The ignitrons IG1 and IG2 are controlled by individual firing circuits including controlled rectifiers 1CRE and 2CRE. Those firing circuits are operated under the control of driving circuits including transistors Q17 and Q18, and transistors Q19 and Q20. Those driving circuits are, in turn, controlled by four separate circuits including a delayed firing system, comprising unijunction transistor IUJ and transistors Q1 through Q4, an ignitron anode voltage sensing system comprising transistors Q5 through Q7, a lead-trail control circuit comprising transistors Q8 and Q9, and a heat control circuit comprising transistors Q10 through Q16.

In the customary present commercial practice, ignitrons, or the like, are customarily employed with so-called anode firing circuits in which the voltage applied across the ignitron also serves as the energizing or plate voltage for the controlling or firing device, such as a thyratron, in the firing circuit. In such systems, the peak line voltage, which can be high due to transients, is in large part applied directly across the firing device which has made it difficult satisfactorily to adapt the system to the use of solid-state firing devices in view of their sensitivity to voltage transients. If the rate of voltage rise is sufficient, as it can well be with line-voltage transients, the firing device can, improperly, fire even though there be no input signal.

In the present arrangement, the problems arising from the transient-voltage sensitivity characteristics of solid-state devices, such as silicon controlled rectifiers, are effectively solved by isolating the firing devices from the line. Specifically, a separate excitation circuit is employed and filtering means are employed between the source of voltage and the device to suppress transient voltage peaks. As a further means, additional filtering means are or may be provided between that device and the ignitron to control the rate of increase of the igniter current.

Among the other advantages which accrue from the disclosed arrangement is the fact that it provides a wide latitude in the selection of the firing angle of the ignitrons, and they can be fired earlier in the half cycle than in the customary commercial circuits.

The two ignitrons IG1 and IG2 are connected in back-to-back or antiparallel relationship between the source S1 and the primary winding of the welding transformer WT, in a manner well known in the art. The operation of these ignitrons is controlled by firing circuits including devices 1CRE and 2CRE. To effectively preclude dangerous premature firing of the ignitrons, switch NWCR is actuated to indicate that the apparatus is prepared for welding. In a common practice, welder control circuits include a timer having a relay, often referred to as the "no-weld relay," which is actuated upon initiation of the squeeze interval provided the apparatus is otherwise in condition to weld, and it is contemplated that the switch NWCR illustrated in FIG. 1 of the drawings may, and normally will be, a contact of that or of a counterpart relay. The no-weld-control relay may well not operate at a point of zero line voltage and could result in a transient signal which would improperly actuate the firing circuit. The illustrated circuits obviate this possible malfunctioning.

When switch NWCR is closed, a circuit is completed from the source S1, through that switch and through fuses F1 and F2 to energize the transformer primary winding T1P, which is inductively coupled to secondary windings T1S1 and T1S2 of that transformer. Secondary windings T1S1 and T1S2 are connected in out-of-phase relationship and the phase relationships of the several windings of that transformer are indicated by the dot placed adjacent one end of each of the windings T1P, T1S1 and T1S2 to denote those winding ends which are of the same polarity at a given instant.

When the voltage across winding T1P is such that the left-hand end of that winding is positive relative to the right-hand end, for example, the voltage induced across secondary winding T1S2 is such that its upper end is positive relative to its lower end. Under that condition, current flows in a circuit including resistor RS1b and rectifier 23RE to charge capacitor 21C so that its upper electrode becomes positive relative to its lower electrode. As will be seen, the energy stored by capacitor 21C is utilized to fire ignitron IG2. Charging resistor RS1b may be provided as a separate element, but in a constructed embodiment of the invention, the effective resistance of the secondary winding T1S2 was found to be adequate and resistor RS1b is illustrated in dotted lines to connote that it represents the internal resistance of the winding.

It will be observed that during this same half cycle, the polarity of the voltage across secondary winding T1S1 is such that rectifier 22RE blocks current flow and hence capacitor 20C does not charge during this half cycle. However, during the subsequent half cycle, in which the polarity is reversed, capacitor 20C is charged in a manner similar to that above described in connection with capacitor 21C in preparation for the firing of ignitron IG1.

Thus, at the end of one full cycle of the current from source S1 following the operation of switch NWCR, both capacitors 20C and 21C are charged in preparation for the operation of the system. Until they charge, the firing circuits cannot actuate the ignitrons. This one-cycle delay serves as a safety measure to insure that the welding electrodes will have engaged the workpiece before welding current is applied to the welding transformer. In the customary timers, squeeze time must be initiated before switch NWCR will close and the necessity of charging capacitors 20C and 21C in order to enable the firing circuits to fire the ignitrons IG1 and IG2 requires that the squeeze time be at least one cycle in duration.

In the preferred arrangement, capacitors 20C and 21C are made sufficiently large to store a substantial amount of energy which may be abruptly discharged through the input circuits of the ignitrons. Once those capacitors are charged, this energy is available for application to those circuits, but cannot be so applied until the control rectifier devices 1CRE and 2CRE have a suitable gating potential applied to their control electrodes or gates.

Means are provided for applying gating pulses to the silicon controlled rectifier devices 1CRE and 2CRE in selectable timed relation to the voltage applied to the anodes of the ignitrons. When the gating signal is applied to controlled rectifier 2CRE (during the half-cycle of the source voltage in which the anode of ignitron IG2 is positive relative to its cathode), that rectifier is rendered conductive to establish a discharging path for capacitor 21C through that rectifier, inductor or choke CH2, resistor 87R, fuse F5, through the igniter-cathode path in tube IG2 and back to capacitor 21C. In the preferred arrangement, capacitors 20C and 21C are preferably of substantial capacitance (such as 20 microfarads) so that a substantial amount of energy can be delivered to the input circuits of the ignitrons. It is a characteristic of the preferred controlled rectifiers 1CRE and 2CRE that when conduction is initiated by virtue of the application of an input signal to their gates, the termination of the gating pulse will not in and of itself terminate conductivity of those devices.

In response to the signal applied to the input circuit of ignitron IG2, that ignitron will conduct between its anode and cathode, producing energization of the welding transformer WT from the source S1 and a resultant application of a pulse of energy to the workpiece WP. In a similar manner, ignitron IG1 is rendered conductive at a selectable point in that half-cycle during which its anode is positive relative to its cathode to similarly energize transformer WT to apply a pulse of energy to the workpiece WP.

It will be observed that the firing energy storage means, such as a capacitor 21C, together with the resistance in its charging circuit, such as the illustrated internal resistance RS1b of transformer winding T1S2, constitute a resistance-capacitance low-pass filter or integrating network. As a result, if the line voltage abruptly and transiently changes, tending to induce a transient voltage peak across secondary winding T1S2, that resistance-capacitance network will effectively suppress the voltage peak from appearing at the controlled rectifier device 2CRE and effectively preclude any such transient from producing a sufficient rate of change of current to cause that device improperly to become conductive.

It will further be noted that the circuit including choke CH2 and the resistance in the discharging circuit for capacitor 21C, including resistor 87R, constitute a filter for limiting the rate of change of the discharge current of capacitor 21C so as to limit the magnitude of the current in the input circuit of the ignitron.

Resistors 78R and 85R, which are connected in parallel with capacitors 21C and 20C, respectively, are preferably of sufficiently large resistance so that they do not significantly affect the normal operation of the circuit. In a practical embodiment, those two resistors were selected to have a value of about 50,000 ohms so that the network including the associated capacitor had a time constant of one second, which is large relative to the normal interval between the charging of the capacitor and the time at which firing circuit will be triggered to apply the pulse of energy to the ignitron. However, at the termination of the operation, when switch NWCR is opened, those resistors serve to discharge their associated capacitor as a safety measure.

The gate signals for the controlled rectifier devices 1CRE and 2CRE are applied through pulse transformers T3 and T4, respectively. Any pulse appearing across the secondary winding of transformer T4, for example, which is of a polarity such that the left-hand end of that winding is positive relative to the right-hand end, is dissipated through rectifier 20RE and resistor 74R. A pulse of the opposite polarity is applied to the input or gate circuit of controlled rectifier 2CRE via resistor 74R to cause that device to apply a discharge pulse from capacitor 21C to the input circuit of ignitron IG2, as above described. The network comprising capacitor 23C and resistors 74R and 75R are elements of a circuit for filtering high-frequency spurious transients and for effectively preventing improper actuation of the controlled rectifier device by transients. The gating pulses applied through transformer T4 are of sufficient magnitude to produce gating of the device despite this filtering or desensitizing network. The other firing circuit operates in a similar manner.

The application of pulses to the pulse transformers T3 and T4 is controlled by the driving circuit comprising transistors Q17 and Q18 and the driving circuit comprising transistors Q19 and Q20, respectively. These driving circuits are controlled by a delayed firing system via conductor 10, by an ignitron anode voltage sensing system via a conductor 12, by a lead-trail control circuit which is connected to the two driving circuits via leads 14 and 16, respectively, and by a heat control circuit via conductor 17. As will be seen, in the illustrated arrangement, each of these leads may be at either of two selected voltages. In the illustrated arrangement these have been selected to be a positive voltage (such as positive 12 volts) and ground.

Conductor 10 is connected to the bases of transistors Q17 and Q19 through resistors 48R and 54R, respectively; conductor 12 is connected to the bases of those transistors through resistors 49R and 55R, respectively; conductor 14 is connected to the base of transistor Q17 through resistor 52R; conductor 16 is connected to the base of transistor Q19 through resistor 53R; and conductor 17 is connected to the bases of transistors Q17 and Q19 via resistors 50R and 51R, respectively.

The emitters of transistors Q17 and Q19 are grounded and their collectors are connected to a source of positive potential through load resistors 57R and 56R, respectively. Negative biasing voltages are applied to the bases of those transistors through resistors 78R and 79R, respectively. If any one of the conductors 10, 12, 14 or 17 is at the noted positive potential (assumed to be 12 volts), transistor Q17 is biased effectively to saturation, and similarly, if any one of the conductors 10, 12, 16 or 17 is at the noted positive potential, transistor Q19 is biased effectively to saturation. These input networks therefore constitute, in effect, "or" gates under which if any one of the noted conductors associated with transistors Q17 or Q19 is at its positive potential or state, the associated transistor is biased effectively to saturation. Under that condition, the collector of that transistor is at a relatively low potential, herein assumed to be ground potential. However, at the instant that all of the noted conductors associated with the transistor concurrently reach the lower (ground) potential, the voltage at the base of that transistor drops sufficiently to render that transistor effectively non-conductive. For example, whenever all of the conductors 10, 12, 16 and 17 concurrently reach ground potential, transistor Q19 is rendered non-conductive and as a result a positivegoing pulse is applied through the capacitor 14C to the base of transistor Q20. The emitter of transistor Q20 is grounded, and the collector is connected to a source of positive potential through the primary winding of transformer T4 and via switch SW1. The base is connected to a source of negative potential through resistor 59R. As a result of the application of the positive pulse to the base, transistor Q20 conducts current from the positive source through switch SW1, and through the primary winding of transformer T4 so that a pulse is induced in the secondary winding of that transformer. The shape and duration of the pulse which is applied to the base of transistor Q20, and hence the shape and duration of the pulse applied to the controlled rectifier device 2CRE via transformer T4 is controlled by means including resistor 56R, capacitor 14C and the resistance of the base of transistor Q20. Rectifier 4RE serves to prevent any substantial negative voltage from being applied to the base of transistor Q20. Rectifier 19RE serves to dissipate the voltage which is induced across the primary winding of transformer T4 upon the collapse of the magnetic field at the termination of conduction of transistor Q20 at the end of the pulse.

The driving circuit including transistors Q17 and Q18 operates in a similar fashion, producing a pulse of energy at transformer T3 in the event that and when the voltages on conductors 10, 12, 14 and 17 all reach their lower or ground potential. It will be noted that switch SW1 also controls the application of positive voltage to the collector of transistor Q18. This switch is provided as a further safety measure and preferably is a contact of or is controlled by the weld-no-weld switch customarily provided in resistance-welder timers and which must be closed in order for welding to proceed. Whenever that switch is open, the driving circuits are incapable of applying pulses through transformers T3 and T4 to the firing circuits.

The lead-trail circuit comprising transistors Q8 and Q9, (FIG. 2) controls, via conductors 14 and 16, which of the two driving circuits and hence which of the two firing circuits can operate at any time, and alternately enables those circuits. This circuit is energized via a transformer, the primary winding T10P of which is illustrated to be connected across the source S1 and the secondary winding T10S of which appears on FIG. 2. When the upper terminal of the secondary winding T10S is positive with respect to the grounded center tap, which occurs when the left-hand terminals of source S1 and primary winding T10P are positive relative to their other terminals, current flows through rectifier 9RE, resistor 66R, resistor 68R, and via the base and emitter of transistor Q8 back to the grounded center tap of secondary winding T10S. The base of transistor Q8 is connected to a source of negative potential through resistor 34R, the emitter is grounded, and the collector is connected to a source of positive potential through load resistor 10R. When the base is driven positive, as described, transistor Q8 conducts substantially at saturation and the voltage at its collector drops effectively to ground potential. This voltage is applied via conductor 14 and through resistor 52R to the base of transistor Q17 in the driving circuit associated with ignitron IG1. This is an enabling signal, which, other conditions met, will permit the firing circuit associated with ignitron IG1 to fire that ignitron, and it will be observed that this occurs during the half cycle in which the anode of ignitron IG1 is positive with respect to its cathode.

During the same half-cycle, the lower terminal of transformer secondary T10S is negative with respect to ground so that transistor Q9 is effectively non-conductive in view of the connection of its base to a source of negative potential through resistor 35R. Consequently, a positive voltage (e.g., 12 volts) is applied via conductor 16 and through resistor 53R to the base of transistor Q19 to disable that driving circuit and the firing circuit including controlled rectifier 2CRE to fire ignitron IG2.

In the preferred arrangement, the turns ratio of the transformer including windings T10P and T10S is selected so that a fairly high secondary voltage is applied to the lead-trail circuit such as, for example 115 volts. As a result, a quite substantial peak positive voltage is applied through rectifier 9RE and resistor 66R. However, rectifier 16RE is connected between a point at the junction of resistors 66R and 68R to a source of much lower positive potential (e.g., 12 volts). Accordingly, rectifier 16RE tends to clamp the voltage at the junction between resistor 66R and 68R to insure that the maximum positive voltage applied to the base of transistor Q8 does not exceed that selected value. Since transistor Q8 will operate with a voltage applied to the base of substantially less than that value, the operating point for that transistor occurs early in the half cycle of the line voltage, approaching quite closely the zero-degree point. Transistor Q8 will remain conductive throughout essentially the complete half-cycle and during the alternate half-cycle will be non-conductive, whereas transistor Q9 will be conductive in the opposite half-cycle. Rectifiers 24RE and 13RE are provided to prevent negative pulses from being applied to the bases of transistors Q8 and Q9, respectively.

The lead-trail circuit, when connected as illustrated, operates continuously whenever the source S1 is connected, operating transistors Q8 and Q9 during alternate half cycles so as alternately to enable the firing circuits associated with ignitrons IG1 and IG2. In order to control when welding occurs and additionally to provide a means for effectively preventing firing during the first half-cycle thereafter so as to prevent saturation of certain types of welding transformer cores, the delayed firing system illustrated in FIG. 1 of the drawings, is provided. The delayed firing system, including unijunction transistor 1UJ and transistors Q1 through Q4, is actuated by a weld signal applied to conductor 20. An appropriate signal is conventionally available in timers associated with present commercial welding equipment. This signal normally is applied when the timer has been set and desirably is synchronized with the voltage from source S1 so that the operating signal is both applied and removed at the zero degree points of the source voltage. In the illustrated arrangement, it is assumed that the weld signal applied to conductor 20 is at an appropriate positive value (e.g., 12 volts) and that the conductor 20 is grounded in the absence of a weld signal.

When the positive weld signal is applied to conductor 20, it appears across a network comprising resistor 30R, variable resistor VR1 and capacitor 1C. The voltage across capacitor 1C is applied to the emitter electrode 21 of unijunction transistor 1UJ, one base electrode 22 of which is connected to a source positive potential through resistor 1R. The other base electrode 24 of that double-base unijunction transistor device is connected to ground through a resistor 4R. Capacitor 1C charges at a rate controlled by resistor 30R and variable resistor VR1, which selects the delay established by the delayed firing system. When the voltage applied to emitter 21 rises to a sufficient value, the impedance of the unijunction device 1UJ between the emitter and base electrode 24 abruptly falls and capacitor 1C discharges over a path including electrodes 21 and 24 and resistor 4R. When capacitor 1C has discharged sufficiently, the voltage applied to emitter 21 falls below the voltage required to maintain the forward bias condition and unijunction device 1UJ changes to a high impedance condition so that capacitor 1C can again commence to charge via resistor 30R and variable resistor VR1. This operation repeats, in the nature of a relaxation oscillator, producing a series of positive-going short-duration pulses across resistor 4R. The time between the receipt of the weld signal via conductor 20 and the first such pulse is closely established, but the oscillatory rate is not synchronized or necessarily related to the frequency of the source S1.

The positive-going pulse appearing across resistor 4R is applied via resistor 12R to the base of transistor Q1. The base of transistor Q1 is connected to the source of negative potential through resistor 38R, the emitter thereof is grounded and the collector is connected to the source of positive potential through load resistor 5R. Transistor Q1 is driven effectively to saturation and as a result a relatively large amplitude negative-going pulse is applied through capacitor 3C and rectifier 1RE to the base of transistor Q2. Transistors Q2 and Q3 are cross-coupled to form a flip-flop circuit, with the collector of transistor Q2 being coupled to the base of transistor Q3 by the network comprising capacitor 5C and resistors 26R and 33R and with the collector of transistor Q3 being coupled to the base of transistor Q2 through a similar network compressing resistors 25R and 32R and capacitor 4C. The collectors of transistors Q2 and Q3 are connected to a source of positive potential through load resistors 6R and 7R, respectively, the bases of those two transistors are connected to a source of negative potential through resistors 32R and 33R, respectively, and the emitters of those transistors are grounded. Transistors Q2 and Q3 conduct alternatively and desirably means are provided for insuring that prior to the receipt of the described pulse, transistor Q2 is conducting effectively to saturation whereas transistor Q3 is cut off. In the illustrated circuit, a signal derived from the timer is employed to serve this function. This signal applied to conductor 26, is assumed to be a positive voltage (e.g., 12 volts) which is applied to conductor 26 at all times before operation of the timer is initiated. This signal could, of course, be derived from any other suitable source.

The positive voltage on conductor 26 is applied to the base of transistor Q2 through resistor 31R and serves to maintain transistor Q2 in a conductive state. When that signal terminates at the time of initiation of the timer (and prior to the application of a signal to conductor 20), the circuit comprising transistors Q2 and Q3 remain in the same state, with transistor Q2 conducting and transistor Q3 non-conductive. However, when the abrupt negative-going signal is applied to the base of transistor Q2 via rectifier 1RE, transistor Q2 is cut off, its collector voltage abruptly rises, and the resulting positive-going signal is applied via capacitor 5C and resistor 26R to the base of transistor Q3 to render that device conductive. The circuit regeneratively switches its state. The successive negative pulses applied to the base of transistor Q2 via rectifier 1RE from transistor R1 will not be effective to change the state of transistors Q2 and Q3 since transistor Q2 is already non-conductive under this condition.

When transistor Q2 is rendered non-conductive, the collector voltage rises abruptly and this signal is applied to the base of transistor Q4 via resistor 40R, that base being connected to a source of negative potential through resistor 46R. The collector of the grounded emitter transistor Q4 is connected to a source of positive potential through load resistor 8R, and when transistor Q4 conducts in response to the positive signal applied to its base, its collector abruptly drops from the iniial positive potential (e.g., 12 volts) to a lower potential, such as ground, and this signal is applied through rectifier 4RE to the conductor 10 which is connected to the driving circuits as previously described. It will be recalled that when this signal is applied to conductor 10, the driving circuits (including transistors Q17 through Q20) are enabled to operate as far as this particular control is concerned, that is, the delayed firing system is no longer able to prevent operation of the ignitrons by the firing circuits.

It will be observed that when transistor Q3 is conducting, its base, and hence the upper electrode of capacitor 6C is at a potential substantially below the voltage applied to the lower electrode of that capacitor via conductor 20, that is, lower than the weld signal voltage. As a result, when the weld signal terminates so that conductor 20 becomes abruptly grounded (which desirably occurs at the zero degree point of the sine wave from source S1), a negative pulse is applied from capacitor 6C through rectifier 2RE to the base of transistor Q3 to render that transistor non-conductive and to thereby cause transistor Q2 to become conductive. Since the termination of the weld signal applied to conductor 20 also terminates the operation of the oscillatory circuit including capacitor 1C and unijunction device 1UJ, there will be no additional pulses applied to the base of transistor Q2 so that the circuit comprising transistors Q2 and Q3 will remain in this state until the next weld signal is received.

It will be seen that the delayed firing system applies a disabling voltage to conductor 10 at all times that the weld signal is not being applied to conductor 18, but that it will shift the potential on conductor 10 to an enabling voltage a timed interval after the weld signal is applied to conductor 18. Since the weld signal appears at the beginning of the weld interval, the delayed firing circuit will be effective during the first half-cycle of the line frequency, only, to prevent firing of either of the ignitrons for a preselected interval even though other elements of the circuits may indicate that welding may proceed. It is presently believed that the optimum delay period is 87½° after the zero degree point of the sine wave of the source S1 at which the weld signal is applied to conductor 20. This interval may be varied to accommodate variations in the power factor of the load by variable resistor VR1. It is desirable, however, that the magnitude of the delay be quite precisely selectable, which is one of the reasons for the present preference for the unijunction device 1UJ for this function. The discharge point of such devices, in properly designed circuits, is substantially independent of supply voltage variations. Additionally, with proper circuit design including desirably the use of a temperature compensated resistor 1R, the emitter voltage at which the device will discharge is substantially independent of temperature. Further, since the device operates at an input voltage which is quite low relative to the voltage on conductor 20, the essentially linear portion of the charging curve of capacitor 1C is utilized. As a result the illustrated system provides extremely precise timing of the interval between the application of an appropriate portntial to the weld line 20 (at the zero degree point) and the instant at which the firing circuits are enabled to fire during the first one-half cycle of operation.

It should again be noted that this delayed firing system does not necessarily cause firing of the ignitrons but merely establishes a minimum firing angle for the first half-cycle, and that after the first half-cycle of any weld, it is ineffective to interfere with the free selection of the firing points of the ignitrons.

The heat control circuit, comprising transistors Q10 through Q16, selectively controls the firing angles of the ignitrons IG1 and IG2 to control the percent heat and hence the magnitude of the energy delivered to the workpiece WP. In general, the heat control has a capacity to produce firing of those ignitrons at any selected phase angle provided the other conditions established by the circuitry are met. Among those other conditions, of course, in the illustrated arrangement, is that if the heat control be set to fire the ignitrons at a phase angle less than a selected value in the order of 87½°, no such firing will occur during the first half-cycle of the weld until after the minimum delay angle which is established by the delayed firing system.

The alternating current signal appearing across the secondary winding T10S (FIG. 2) is synchronized with the source S1. This signal is full-wave rectified by rectifiers 10RE and 11RE and applied through resistor 65R to one electrode of rectifier 15RE, the other electrode of which is connected to a source of negative potential. Rectifier 15RE prevents the voltage on conductor 32 from becoming more negative than a selected value, such as negative 12 volts. If the magnitude of the voltage of the negative peaks of the full-wave rectified signal be large relative to that selected negative 12 volt value, then the voltage on conductor 32 will be in the form of a negative 12 volt signal with a positive-going (to ground) spike each 180°.

This signal is applied through resistor 72R at the base of transistor Q10, that base being connected to a suitable source of positive potential through resistor 82R. Transistors Q10 and Q11 are interconnected as a multivibrator in a form of Schmitt trigger circuit, with the collector of transistor Q10 being coupled to the base of transistor Q11 via a network comprising capacitor 25C and resistors 44R and 22R, and with the emitters of the two transistors being coupled via resistor 63R. When the voltage on conductor 32 is at the negative 12 volt level, transistor Q10 is held in a non-conductive state and transistor Q11 is conducting. At the positive-going input signal applied via conductor 32 to the base of transistor Q10, transistor Q10 begins to become conductive and as a result of the coupling between transistors Q10 and Q11, transistor Q10 becomes fully conductive very rapidly and transistor Q11 is driven below cutoff. The magnitude of the input voltage to the base of transistor Q10 at which this triggering will occur is quite precise and repetitive and the point at which the triggering occurs in relation to the voltage of source S1 can be precisely selected by selection of the parameters of the trigger circuitry, by selection of the turns ratio of transformer T10 to control the magnitude of the a.c. voltage across secondary winding T10S, and by selection of the magnitude of the negative biasing voltage applied to rectifier 15RE. In a constructed arrangement, with 115 volts across the secondary winding T10S, the circuit comprising transistors Q10 and Q11 was accurately triggered 10° in advance of the zero degree point (and the 180° point) on the a.c. wave form, transistor T10 being rendered conductive and transistor Q11 being rendered non-conductive.

The trigger remains in this condition until the positive signal diminishes toward the selected negative 12 volt point and in the constructed embodiment, this occurred at about 10° after the zero degree point (and the 180° point) of the wave form of the source S1. At that time, transistor Q10 again becomes non-conductive and transistor Q11 again becomes conductive. When transistor Q11 is conducting, its collector voltage is at a relatively low value, approaching ground. When transistor Q11 is non-conductive, at each pulse on conductor 32, its collector voltage is at a higher voltage such as 12 volts positive. Consequently, during the operation of the circuit, conductor 34 is supplied 120 times per second with a positive-going (from ground) to positive 12 volts) essentially square-wave pulse of relatively short (e.g., 20°) duration and having its leading edge accurately related to and in advance of (e.g., 10°) of the zero degree point (and 180° point) on the a.c. wave form of source S1.

The pulses are applied to the base of transistor Q12 by a network comprising capacitor 9C and resistors 61R and 45R. Transistor Q12 is rendered conductive by each such pulse to apply a corresponding series of negative-going pulses to a multivibrator circuit comprising transistors Q14 and Q15 via a network including capacitor 10C and rectifier 5RE. The multivibrator including transistors Q14 and Q15 is similar to the multivibrator comprising transistors Q2 and Q3 (FIG. 1) above described and operates in a similar fashion. Transistor Q14 is normally cut off and transistor Q15 is normally conducting.

At each of the short-duration negative-going pulses applied to the base of transistor Q14 by transistor Q12, transistor Q14 is turned off and transistor Q15 is turned on. When transistor Q15 is triggered to its conductive state, its collector voltage falls essentially to ground potential and this voltage is applied via conductor 15 and a network including resistors 43R and 47R to the base of transistor Q13 to block conduction in that transistor. As a result, the collector voltage of transistor Q13, at conductor 17, is approximately 12 volts positive. This signal is applied through resistor 50R to conductor 18 to disable the driving circuit comprising transistors Q17 and Q18 and is applied via resistor 51R to conductor 19 to disable the driving circuit comprising transistors Q19 and Q20. It will be noted that this occurs slightly (e.g., 10°) before the cycle commences.

When transistor Q14 is rendered non-conductive just prior to the beginning of a cycle, the potential at its collector rises and is applied across the network comprising variable resistors VR2 and VR3, resistor 29R, and capacitor 2C. Capacitor 2C charges at a rate determined by the resistance of the charging circuit. Variable resistors VR2 and VR3 are provided to permit selection of the per cent heat and the power factor adjustment, respectively. Resistor 29R establishes the maximum heat for which the system can be set, with VR2 and VR3 set to their minimum resistance positions.

The charge on capacitor 2C is applied to the emitter of unijunction transistor 2UJ which functions in the same manner as unijunction device 1UJ, previously described. When the voltage across capacitor 2C rises to a sufficient value, unijunction device 2UJ operates to apply a positive-going pulse to the base of transistor Q16 through a network comprising resistors 13R and 39R and capacitor 12C. Transistor Q16 is rendered conductive and desirably saturates, and its collector voltage drops from, say, 12 volts to approximately ground potential to develop a negative-going pulse which is applied through capacitor 11C and rectifier 6RE to the base of transistor Q15 to restore the trigger circuit comprising the transistors Q14, Q15 back to its original state. The reestablishment of conduction in transistor Q14 effectively removes the charging source for capacitor 2C. The termination of conduction through transistor Q15 results in the application of ground potential via conductor 15 and resistor 43R to the base of transistor Q13 to cause that device to become fully conductive. As a result, its collector voltage at conductor 17 drops substantially to ground potential which is communicated to conductors 18 and 19 through resistors 50R and 51R to enable the driving circuis and the firing circuits to fire the ignitrons IG1 and IG2, as far as this control is concerned. As will be seen, in the normal operation of the circuit, all of the other conditions enabling one of the two firing circuits to operate have normally been met prior to the receipt of this heat-control signal so that normally it is the application of ground potential to conductor 18 and 19 which actually produces the firing of the appropriate one of the two ignitrons IG1 and IG2.

The ignitron anode voltage sensing equipment including transistors Q5 through Q7 serves to overcome that which has been a serious disadvantage of separate excitation types of firing systems. The apparatus thus far described will function satisfactorily but is subject to possible misfiring with highly inductive loads. Thus, if the load current trails the load voltage due to the inductive reactance of the load, the ignitron which is fired during one-half cycle may continue to conduct even through the phase of the line voltage has reversed. Under this circumstance the voltage across the second ignitron may not rise sufficiently to permit firing of that ignitron until some time after the line voltage itself actually switches polarity. If this condition exists, it is possible for the system to misfire since the self-excitation firing system would discharge capacitor 20C or 21C into the ignitor circuit at the appropriate time even through the anode voltage of the associated ignitron may not have risen sufficiently to permit firing, and it is possible for the energy stored in the capacitor to be fully dissipated before the anode voltage rises adequately to permit conductiion in the ignitron. The ignitron anode voltage sensing system obviates this possible malfunctioning.

Upon the closure of the no-weld switch NWCR (FIG. 1) primary winding T5P is connected between the anodes of the two ignitrons IG1 and IG2 in series with a pair of protective fuses. The voltage across that winding will therefore vary in accordance with the difference between the voltages at the anodes of the two ignitrons. When the anode voltage of either ignitron rises with respect to the other, a voltage is induced across the secondary winding T5S, which is full-wave rectified by rectifiers 7RE and 8RE and applied via resistor 64R to the upper electrode of rectifier 17RE, the lower electrode of which is connected to a suitable source of reference voltage such as positive 12 volts. A rise in voltage at the upper electrode of rectifier 17RE toward the clamped value of 12 volts is communicated via a network comprising resistors 70R and 71R to the base of transistor Q5 which is interconnected with transistor Q6 as a form of Schmitt trigger circuit similar to the circuit including transistors Q10 and Q11 previously described. In response to this signal, transistor Q5 abruptly conducts to saturation and transistor Q6 is abruptly cut off, transmitting a positive-going pulse to the base of transistor Q7 via a coupling network comprising capacitor 17C and resistors 60R and 42R. As a result, transistor Q7 is driven effectively to saturation so that its collector output voltage, applied to conductor 12, falls essentially to ground potential. This voltage is applied to the bases of transistors Q17 and Q19 to enable both of those driving circuits to actuate their associated firing circuit. However, this does not occur until the voltage between the anodes of the two ignitrons has actually changed and been sensed so as to prevent the above-noted misfiring.

In the arrangement illustrated in FIGS. 3 and 4 of the drawings, a pair of back-to-back connected controlled rectifier devices 1IG and 2IG selectively control the energization of the welder transformer T15 from the source S. The controlled rectifiers 1IG and 2IG are preferably ignitrons although they can be, of course, other devices including appropriate solid state devices. The firing circuits 100 and 102 for the ignitrons 2IG and 1IG are so-called anode firing systems in that each is connected between the anode and the igniter of its respective ignitron. The firing device is a silicon controlled rectifier such as SCR2 in firing circuit 100 (the other firing circuit 102 being identical). A positive-going input pulse applied via transformer 3T and through closed "weld" switch SWB4 is filtered by a network including resistor R3 and capacitor C2 and applied between the gate and cathode of rectifier SCR2. Diode RE2 connected between the gate and cathode of that rectifier is poled to pass negative-going pulses and to prevent the gate from going negative relative to the cathode. If the anode of rectifier SCR2 is positive relative to the cathode thereof at the instant of the application of the pulse (as other circuits to be described insure), current will flow from source S via line L2, through the primary of welder transformer T15, through rectifier SCR2, through serially interconnected diodes RE5 and RE6, through choke L3 and resistor R80, the igniter and cathode of ignitron 2IG, and back to the source via line L1. Rectifiers RE5 and RE6 are shunted with individual voltage balancing resistors R8 and R9, respectively. Current through the noted path fires ignitron 2IG to connect the welder transformer T15 across source S. After ignitron 2IG has extinguished, firing circuit 102 fires ignitron 1IG during the next halfcycle to reconnect welder transformer T15 across source S, with the current during successive half-cycles flowing in opposite directions through the primary winding of the welder transformer.

As in the system of FIGS. 1 and 2, if the pulse is applied to the firing for one ignitron before the other ignitron has extinguished (and hence before the anode to cathode voltage of the subject ignitron is correct), the voltage pulse will not produce firing of the ignitron. Since no additional firing pulse can be applied during that same half-cycle, the ignitron will not be actuated during that half-cycle. Accordingly, means are provided to insure that the voltage pulse which is applied to the firing circuit 100 or 102 will not be applied unless the associated ignitron is otherwise prepared to fire.

This is accomplished by sensing the voltage between the anodes of the two ignitrons and hence the voltage across each of the ignitrons, and particularly, sensing the change of that voltage which occurs as a result of the changes of the conductivity of the two ignitrons. The primary winding of a sensing transformer 4T is connected between tha anodes of the ignitrons 1IG and 2IG and hence is connected across each of those ignitrons. The center tap of the secondary winding of transformer 4T is grounded and the portion of that secondary winding between the center tap and line 104 serves as the voltage supply for transistor 3Q in the firing system for ignitron 2IG. Correlatively, the other half of that secondary winding serves as the voltage supply for a corresponding transistor of the firing system for ignitron 1IG.

As will be seen, transistor 3Q is signaled that ignitron 2IG should be fired by an abrupt reduction in the voltage applied to its base. Prior to that event, and at the instant (in the assumed stage of functioning) ignitron 1IG extinguishes, the voltage across that ignitron abruptly rises to produce a voltage across the secondary winding of transformer 4T of a polarity such that conductor 14 is positive relative to the grounded center tap. As a result, current flows from conductor 104, rectifier RE39, resistor R48, through the collector and emitter of transistor 3Q to ground, a positive voltage being provided to the base at this time, as will be seen. As a result, the potential of the collector of transistor 3Q will drop to a low positive value (approaching ground). When the potential at the base of transistor 3Q is subsequently reduced, which occurs at a time during the subject half-cycle controlled by the heat control circuit, as will be described, transistor 3Q becomes non-conductive and the potential at its collector abruptly rises if but only if transformer 4T is supplying a proper voltage thereto, which occurs only if ignitron 1IG has extinguished. If ignitron 1IG has not extinguished at the instant that the voltage at the base of transistor 3Q is lowered, the voltage at the collector of transformer 3Q will not rise until that ignitron does extinguish. Until the voltage at the collector of transistor 3Q does rise, no firing pulse can be transmitted to the firing circuit 100, and in this manner it is insured that the firing pulse will not be applied to ignitron 2IG until ignitron 1IG has extinguished and the voltage across ignitron 2IG is appropriate.

When the voltage at the collector of transistor 3Q rises, that voltage is applied across a circuit including resistor R49, four-layer diode RE52, and resistor R52 (shunted by capacitor C22). While the maximum positive voltage at the collector of transistor 3Q is limited by clamping diode Re41, the voltage is adequate break down four-layer diode RE52 and to apply a voltage to the gate of silicon controlled rectifier SCR6.

Silicon controlled rectifier SCR6 is energized from an alternating current source 6S which is preferably the same as or derived from the source S. The phasing is such that the alternating current applied across rectifier SCR6 is in its positive half-cycle when the voltage from source S applied across ignitron 21G is in its negative half-cycle. During the half-cycle in which ignitron 1IG conducts, currents flows from the secondary winding or transformer 10T, the center tap of which is grounded, lead 108, resistor R51, rectifier RE44, capacitor C24 and back via ground to the center tap of the secondary winding of transformer 10T. Capacitor C24 becomes charged.

When during the next succeeding half-cycle (the half-cycle in which ignitron 2IG is to be fired), the above-described positive voltage is applied to the gate of rectifier SCR6, that rectifier is rendered conductive and capacitor C24 discharges over a circuit from its upper terminal, conductor 110, primary winding of transformer 3T, conductor 112, anode and cathode of rectifier SCR6, and back to the other terminal of capacitor C24. This discharge current through the primary winding of transformer 3T creates the pulse which fires the firing device SCR2 to fire ignitron 2IG. It will further be observed since capacitor C24 is charged during one half-cycle and discharges its energy into the firing circuit during the next half-cycle, there is but one opportunity to fire ignitron 2IG in any given hlaf-cycle, illustrating one aspect of the significance of the means for insuring that the ignitron is prepared to fire before the pulse is transmitted.

Corresponding controls and protections are provided for the firing circuit 102 for ignitron 1IG, with the requisite phase reversal. Thus, in the firing system for ignitron 1IG, the voltage counterpart of that appearing at the collector of transistor 3Q is derived from the other half of sensing transformer 4T, that is, from the portion of the secondary winding thereof between conductor 114 and the grounded center tap. Similarly, the voltage for charging the counterpart of cpacitor C24 in the other firing system is derived from the opposite phase of the voltage appearing across transformer 10T.

As noted above, the time at which the potential at the base of transistor 3Q is changed determines the firing point of ignitron 2IG. The time in the cycle at which this event occurs is determined by a heat control circuit. That circuit can be of the type above discussed in connection with FIGS. 1 and 2, in which timing is initiated from a preselected instant on the line voltage wave and continues for an interval determined by the charging rate of a capacitor (capacitor 2C in FIG. 2) through a resistance network including a heat adjusting variable resistance (VR2 in FIG. 2) and a power factor adjusting variable resistance (VR3, FIG. 2).

The power factor adjusting variable resistance in FIG. 2 is provided to accommodate the delay between the zero degree (or 180°) point on the line voltage wave and the point at which the ignitron anode voltage actually reverses due to the inductive component of the resistance-welder load. Conventional heat controls normally delay the firing of the ignitrons (or other controlled rectifier devices) for a selectable angle measured from a reference point on the line voltage curve, usuallly the zero degree point (and 180° point) on that curve. A 100 percent heat setting would result in the application of igniter current to the ignitrons at that point. However, the ignitron cannot fire there unless the voltage between its anode and the mercury pool is of the correct polarity and of adequate amplitude. With back-to-back connected ignitrons, that condition cannot exist until the other ignitron of the pair has extinguished. A characteristic of controlled rectifiers such as ignitrons is that once fired, they will continue to conduct as long as a minimum holding current is maintained. With the normal inductive load in a resistance welding system, the current lags the voltage, so that the conductive ignitron will normally continue to conduct after the line voltage has reversed and after the zero degree (or 180°) point on the line voltage curve. An example is represented in FIG. 5. During a portion of the first negative half-cycle of the line voltage curve E, the negative ignitron is conducting. At the point marked zero degrees on that curve, the line voltage reverses. However, the current through that ignitron and the load lags the line voltage due to the inductive component of the load. In the illustration of FIG. 5, it is assumed that the load is such that the current 1 lags the voltage by about 37° (80 percent power factor). Therefore, the conducting ignitron will continue to conduct after the noted zero-degree point until the current through the ignitron falls below the holding value. When that occurs, the voltage at the positive (non-conducting) ignitron reverses and firing at precisely that point (which is later than the zero degree point on the line voltage wave) would produce 100 percent heat.

In the customary prior practice, the effect of the power factor angle is compensated for by adjusting the power factor variable resistor (such as VR3 in FIG. 2. In common practice, a typical workpiece is inserted during initial setup, the heat control is set at 100 percent, and the power-factor control is then adjusted to equal, approximately, the delay between the zero degree point (or 180° point) of the voltage wave and the point of extinction of the conducting ignitron with that load (which approaches the zero degree point of the current curve I). In many cases, this adjustment is rarely changed even through different types or thicknesses of workpieces are welded with a resultant shift of the power-factor of the load.

In the system illustrated in FIGS. 3 and 4, power factor adjustment is performed automatically and continually, and the timing of the delay interval (selected by the heat control) is initiated not at the zero degree point (or 180° point) of the line voltage wave or at any other fixed point in reference to the line voltage wave, but rather at the point of voltage reversal across the ignitrons. Thus, timing is initiated at a point which is effectively equal to the power factor angle.

In the representation of FIG. 5, the current has fallen below the holding value at point A, which is close to the zero point of the current I. At the point, the voltage across both ingitrons quite abruptly jumps to the instant line voltage value, that is the value at the point marked B. The voltage across the ignitrons then follows the sinusoidal line voltage curve unit such time as the heat control fires the positive ignitron. In the illustration of FIG. 5, this is assumed to occur at the point C. Upon the firing of the positive ignitron the voltage across both ignitrons abruptly drops to a low positive value determined by the drop across the ignitron. This is illustrated as voltage D in FIG. 5. At the 180° point on the voltage curve E the line voltage reverses. However, since there is still substantial current flow through the conducting ignitron, the voltage across the ignitrons continues at the level D unit the current drops below the holding value, at point F. Thereupon, the conducting positive ignitron extinguishes and the voltage across both ignitrons abruptly changes to the instant negative value of the line voltage curve, as illustrated at point G. The voltage across the ignitrons then follows the sinusoidal line voltage curve until it reaches point H at which time the firing circuit fires the negative ignitron 11G which produces a drop of the voltage across both ignitrons to the level labeled J on FIG. 5.

In the system of FIGS. 3 and 4, the initiation of the timing of the fire delay in each half-cycle is accomplished by sensing the reversal of the voltage across the ignitrons occuring as at points A, and F, in FIG. 5, and this sensing is accomplished with the same transformer 4T which is utilized to insure against premature application of the firing pulses to the firing circuits. Thus, the two ends of the center-tapped secondary winding of transformer 4T are connected via conductors 114 and 104 to respective ones of two diodes RE9 and RE12. During the period of conduction of either of the ignitrons, when the voltage across the ignitrons (and between their anodes) is continuing at a steady level, no voltage is induced across the secondary winding of transformer 4T. However, at the extinction of the conducting one of the two ignitrons, the voltage across the ignitrons (and the voltage between their anodes) abruptly changes in a positive or negative sense, as at points A and F in FIG. 5. At that instant, a voltage is generated across the secondary winding of transformer 4T and conventional current flows from a positive source of potential through resistor R68, resistor R66, the appropriate one of the rectifiers RE9 and RE12, through conductor 104 or 114 and to that half of the secondary winding of transformer 4T which is at that instant negative. This produces an abrupt reduction in the potential at the base of transistor 4Q and terminates conductivity of that device. As a result, the potential at the collector of transistor 4Q rises and this increased positive potential is applied via conductor 122 to establish current flow through resistor R58, through a heat range adjusting potentiometer P2 (with a portion of the current flowing to ground through resistor R61) through the heat adjust variable resistor P5, resistor R60 and through capacitor C27 to ground. This charging current will continue for the requisite period because following the extinction of the previously conducting ignitron and the resultant abrupt change of voltage across that ignitron, the voltage between the anodes of the two now non-conducting ignitrons follows the sinusoidal line voltage wave to continue to produce a voltage across the secondary winding of transformer 4T to continue to hold transistor 4Q non-conductive. The charging of capacitor C27 through the noted resistive path times the delay in the half-cycle before the firing of the ignitron, that is, it times the firing angle. It will be observed that the charging was initiated at the instant of extinction of the previously conducting ignitron so as to achieve automatic power factor adjustment.

When the voltage across capacitor C27 has risen to the preselected value, unijunction UJT3 becomes conductive, in the manner described, producing an increase in the potential at the first base due to the voltage drop across load resistor R59, and this increase in voltage is applied via diode RE50 to the gate of silicon controlled rectifier SCR7. That rectifier is accordingly rendered conductive, with current flowing from the secondary winding of transformer 10T, through the full wave rectifier network RE47 and RE48, load resistor R55, through rectifier SCR7 and to ground. As a result, the potential at the anode of rectifier SCR7 drops to a lower positive value approaching ground, and this reduction in potential is communicated via diode RE46, conductor 126 and resistor R46 to the base of transistor 3Q to turn that transistor off as previously discussed. This produces the firing pulse to fire the associated ignitron.

Upon that firing, the voltage appearing across the primary winging of transformer 4T drops to the arc value, and during the steady-state condition, no signal voltage is applied to the base of transistor 4Q and that base is driven substantially positive by the potential applied thereto through resistor R68. Transistor 4Q thereupon becomes conductive and reduces the potential at the second base of unijunction UJP3 close to ground value. This permits capacitor C27 to discharge in preparation for the next half-cycle of operation of the system.

While the operation of the system has been described in connection with a typical cycle, it will be understood that various firing angles may be selected and that if desired, and preferably, a minimum delay (such as the 87 ½° delay above-described in connection with FIGS. 1 and 2) may be imposed on the first-half cycle of operation of the system during each weld. This may be accomplished in any suitable fashion such as by the use of an "and " gate similar to that utilized in the system of FIGS. 1 and 2.

While the expression "controlled rectifier device" has been used in this specification, it will be appreciated that the ignitrons, or their equivalents, do not truly perform a rectifying function in the systems of the drawings, and the use of that term is not intended to require that the devices in fact rectify current. It will be further recognized that transformer 4T in the system of FIGS. 3 and 4 serves as sensing means for effectively sensing the power factor of the load and produces a signal indicative thereof. The heat control circuits are controlled by the sensing transformer, or equivalent sensing means in or across a portion of the load circuit, by virtue of their responsivity to the signal produced by that transformer. The heat control itself is, of course, basically a form of timing means which times the delay which shall occur between the instant of initiation of the timing and the instant at which the ignitrons or their equivalent are fired in each half-cycle. In the system of FIGS. 3 and 4, that timing is actually initiated by the sensing means. That initation occurs, in the illustrated arrangement, at the instant that the conducting ignitron becomes non-conductive, which coincides, for all practical purposes, with the point at which the lagging current reaches zero. Hence, the signal produced by the transformer is indicative of the delay between the zero point on the voltage wave and the zero point on the current wave and hence is indicative of the power factor of the load.

While the arrangement of FIG. 4 utilizes ignitrons controlled by silicon control rectifiers, it will be recognized that in accordance with convention practice the SCR's may be used directly as the controllable means for interconnecting the power source and the welder transformer (as by omitting the ignitrons in FIG. 4, connecting the cathode of silicon controlled rectifier SCR2 directly to the anode of the corresponding silicon controlled rectifier in firing circuit 102 and connecting the cathode of the latter directly to the anode of the former and omitting the ignitrons) if the load requirements are such that they can be handled, in a given installation, by the silicon controlled rectifiers.

While the above described embodiments provide a satisfactory control of the energy being fed to a weld in response to variations in power factor, it has been found that a fully automatic full range system is desired under many circumstances.

Referring to FIG. 5, it is seen that the reversal of the voltage and achieving line voltage across the ignitrons, as sensed by the transformer interconnected across the ignitrons, is approximately equal to the lag or zero current point of the current wave form due to the inductive character of the load. Thus, it is seen that the jump in voltage from approximately zero volts across the ignitrons due to the conduction of one ignitron at point A to the line voltage at point B occurs approximately at the zero current cross-over point. Thus, the relationship between the zero current cross-over point and the zero voltage cross-over point may be termed the power factor angle.

The remaining portion of the voltage cycle is then seen to be 100 percent for the particular load, correlated with its inductive characteristics, connected to the power supply. It is the energy under this remaining curve which is controlled to provide from zero to approximately 100 percent of this energy to the load, also known as the percent heat.

In accordance with the system of the embodiment to be described in conjunction with FIGS. 6-11, it has been found that an accurate control of the heat being supplied to the load may be achieved from zero to approximately 98 percent heat through a system which includes generating a straight line wave form which starts at the zero voltage point or the zero cross-over point of the voltage and advances along a preselected line with a preselected slope until such time as the reversal of the voltage across the ignitrons or the achieving of line voltage is sensed. At this time, the system of the present invention generates a second straight line having a slope which is selected in accordance with the percent heat desired at the load, this percent heat being a percentage of the energy remaining under the remainder of the curve to the zero voltage cross-over point. The slope of this latter straight line is increased toward infinity to achieve very nearly full (100 percent) heat or is decreased to a point which may coincide with the original slope to achieve very nearly zero heat.

Further, a reference level is generated within the system to be described, which reference level is compared with the magnitude of the signal generated after the achieving of the zero current cross-over point. When the magnitude of the signal represented by the second line equals or slightly exceeds the reference level, the ignitrons are fired to supply heating energy to the load.

With the system described above, the control of the present heat is a variant which is independent of the power factor of the load and, for a particular setting of the slope of the second line signal, will generate a preselected percent heat relative to the total energy under the envelope formed by the line voltage signal after the zero cross-over point. Thus, for a preselected slope of the second line, taking for example 75 percent heat, the second signal will equal or slightly exceed the reference level at a point which permits three-fourths of the energy level remaining under the curve after firing to be fed to the load circuit.

Referring now to FIGS. 6 through 11, it has been found that completely automatic phase shift correction can be achieved by sensing when the current drops to zero relative to the point in time when the voltage drops to zero. With the system of the present invention, a circuit is provided which generates a linearly increasing straight line curve having a preselected slope. This curve is generated at the point in time when the voltage is at a zero potential.

When the system senses the current crossing over at the zero point, a second timer is switched into circuit with the timing system, the second circuit generating a linearly increasing signal having a straight line configuration, the slope of this latter signal being selectively variable to select the percent heat which is to be fed to the work. In this particular situation, it has been found that a single slope setting, as for example for 75 percent heat, will provide the load with 75 percent of the energy available from the zero current cross-over point to the end of the voltage half-wave. When the second curve reaches a preselected pulsing level, the ignitrons are fired to cause energy to flow through the electrodes to the workpiece. As is readily apparent, at a 100 percent phase shift, the current will not cross the zero point prior to the end of the voltage half-wave and the second curve will not be generated for any cycle in which this occurs. This is due to the fact that there is no energy remaining between the zero current cross-over point and the end of the voltage half-wave.

Figure 6:
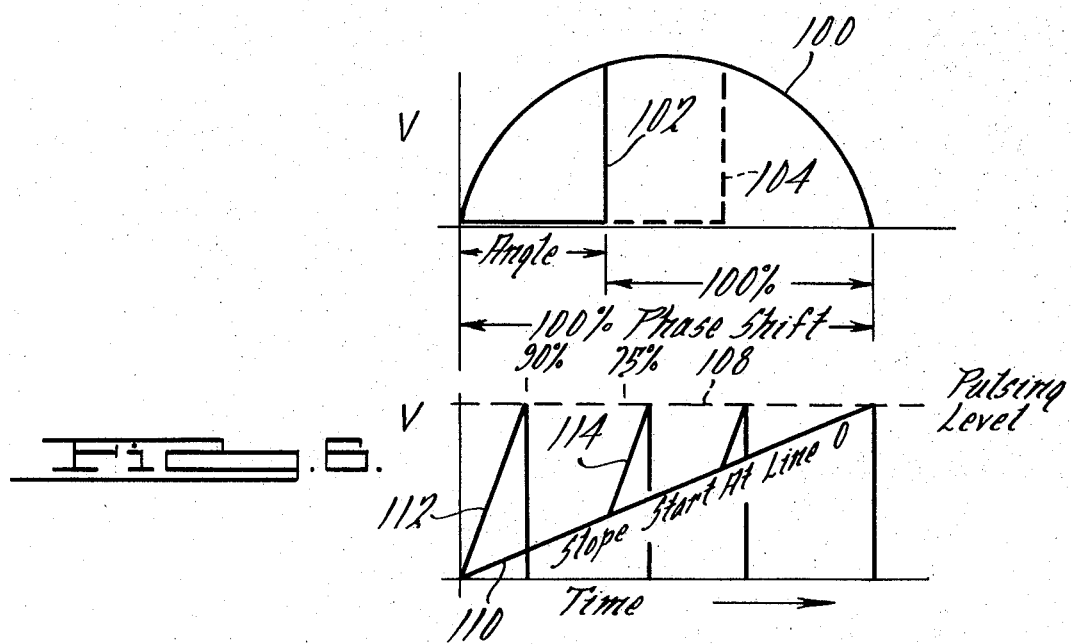
FIG. 6 is a graph illustrating the phase relationship of the line voltage and current and the voltage versus time relationship of the timing pulse for the system of the present invention.

Referring now to FIG. 6, there is illustrated, in the upper portion thereof, a voltage-versus-time curve 100 which illustrates the start of a half-wave of the line voltage and also the voltage across the anode-cathode circuit of the ignitron which is controlling the load during a particular half cycle. Also, the wave form illustrates the relationship of the voltage across the controlling ignitron by means of a curve 102. The conduction of the ignitron starting, for a 100 percent heat, at some time later than the start of the positive line voltage, this later starting point being the phase shift angle of the circuit. This phase shift angle is directly related to the reactive impedance of the load, as is commonly known in the art. A second dotted curve 104 indicates a firing point for the controlling ignitron when something less than 100 percent heat is desired, as for example 50 percent heat. 50 percent heat indicates the percent of energy remaining under the curve 100, after the firing of the ignitron, relative to the amount of energy under the curve after the start of the current in a positive direction, thus the start of curve 102. If the load is purely reactive, the circuit is considered to have 100 percent phase shift and the voltage will be offset from the current by 180°. In this situation, the current will start at the time the voltage curve crosses zero in the negative going direction.

Referring to the lower portion of FIG. 6, there is illustrated the voltage-versus-time graph illustrating various percent heats for selected phase angle shifts. For example, if the load is purely resistive, the current will be exactly in phase with the voltage and will start positive at the same time the voltage starts positive. The lower portion of FIG. 6 includes a pulsing level 108 which is preset in the circuit to be described in conjunction with FIGS. 7 to 11. The system includes a circuit for sensing when the line voltage crosses zero and generating a constant slope curve 110 within the system for a purpose to be hereinafter explained. The slope of the curve is determined by the level of the pulsing level 108 and the period of one-half wave of line voltage. A second circuit within the system of FIGS. 7 to 11 senses the zero cross-over point of the line current by sensing, in the specific embodiment illustrated, the change in polarity across the ignitron signifying the extinction of one ignitron, thus a reversal in polarity of the line current through the load. The second signal is utilized to generate a second linearly increasing voltage, the slope of which is determined in accordance with the percent heat desired. Referring particularly to curve 112, in the purely resistive load circuit, the slope of curve 112 is selected to intersect the pulsing level curve 108 at a point which fires the ignitrons at a 90 percent heat. It is to be noted that the curve 112 starts at the zero angle point. On the other hand, if the load circuit is reactive, the reversal will not occur until some time later, for example at the time illustrated by curve 102. If the slope of a second curve 114 is selected to be the same as the slope of curve 112, it has been found that the firing point for the ignitrons will occur at a time when 90% of the energy remains under the voltage curve after the firing of the ignitrons. Thus, a system has been evolved which enables the user to vary the percent heat by merely selecting the slope for curve 112 or 114 and the system has been rendered fully phase shift compensated.

Figure 7:
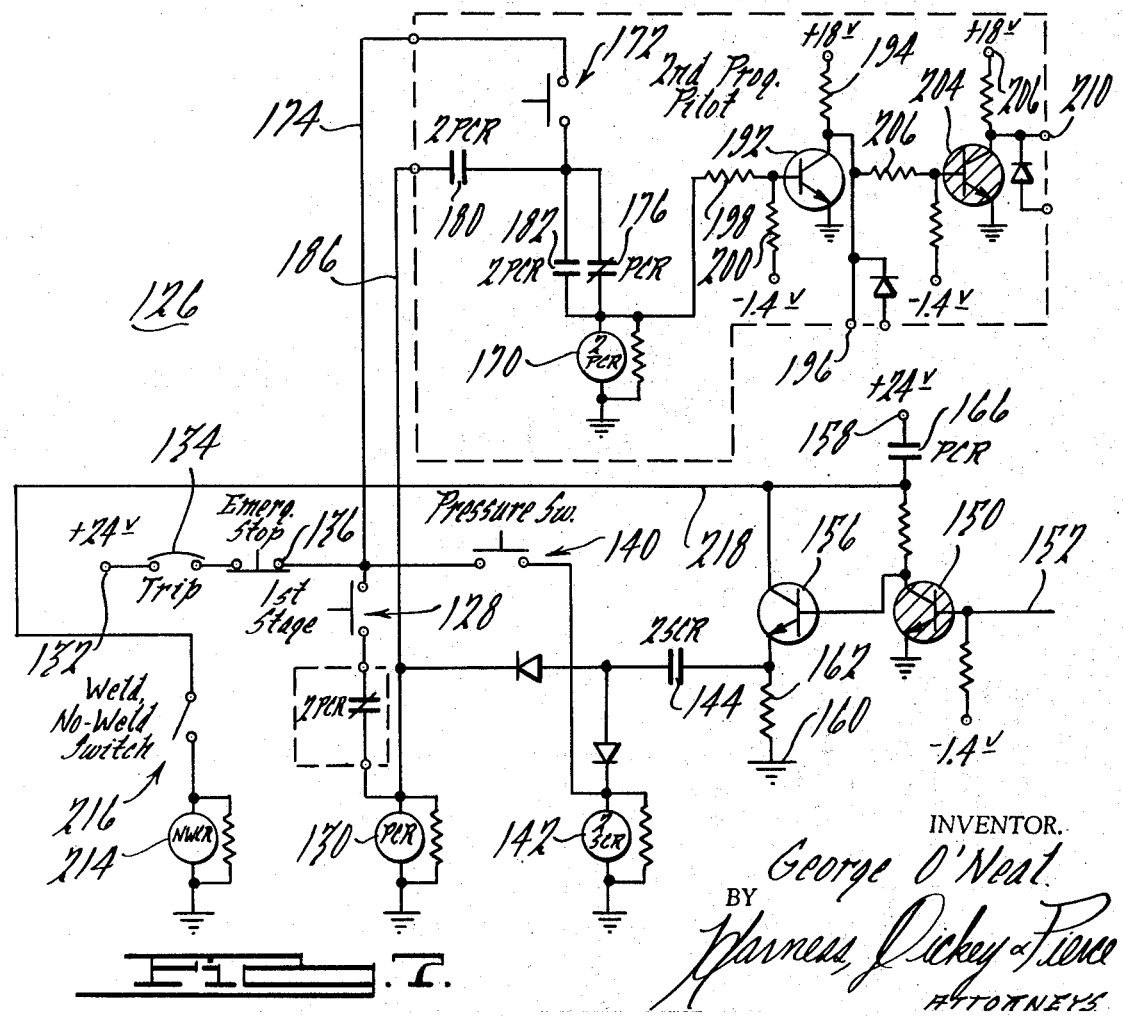
FIG. 7 is a schematic representation of a portion of another electrical control circuit embodying other principles of the present invention.

Referring now to FIG. 7, there is illustrated a relay control circuit 126 which is utilized to enable and control the system of the present invention. Particularly, the circuit 126 includes a manually operated first stage or first pilot switch 128 which is utilized to control the application of electrical energy to a PCR pilot control relay 130 from a source of direct current energy at input terminal 132. The pilot control relay, as will be seen, signals the start of a weld cycle. The input energy from terminal 132 is also controlled by a trip switch 134, a safety switch, and an emergency stop switch 136 which permits an operator to shut down the entire system on an emergency basis.

The system also includes a pressure switch 140 which senses the application of pressure at the welding gun, the pressure switch closing when a preselected gun pressure is achieved. When this latter switch 140 closes, energy is supplied to a 2SCR relay coil 142, the energization of the relay 142 closing a pair of 2SCR contacts 144 for a purpose to be hereinafter explained.

Figure 9:
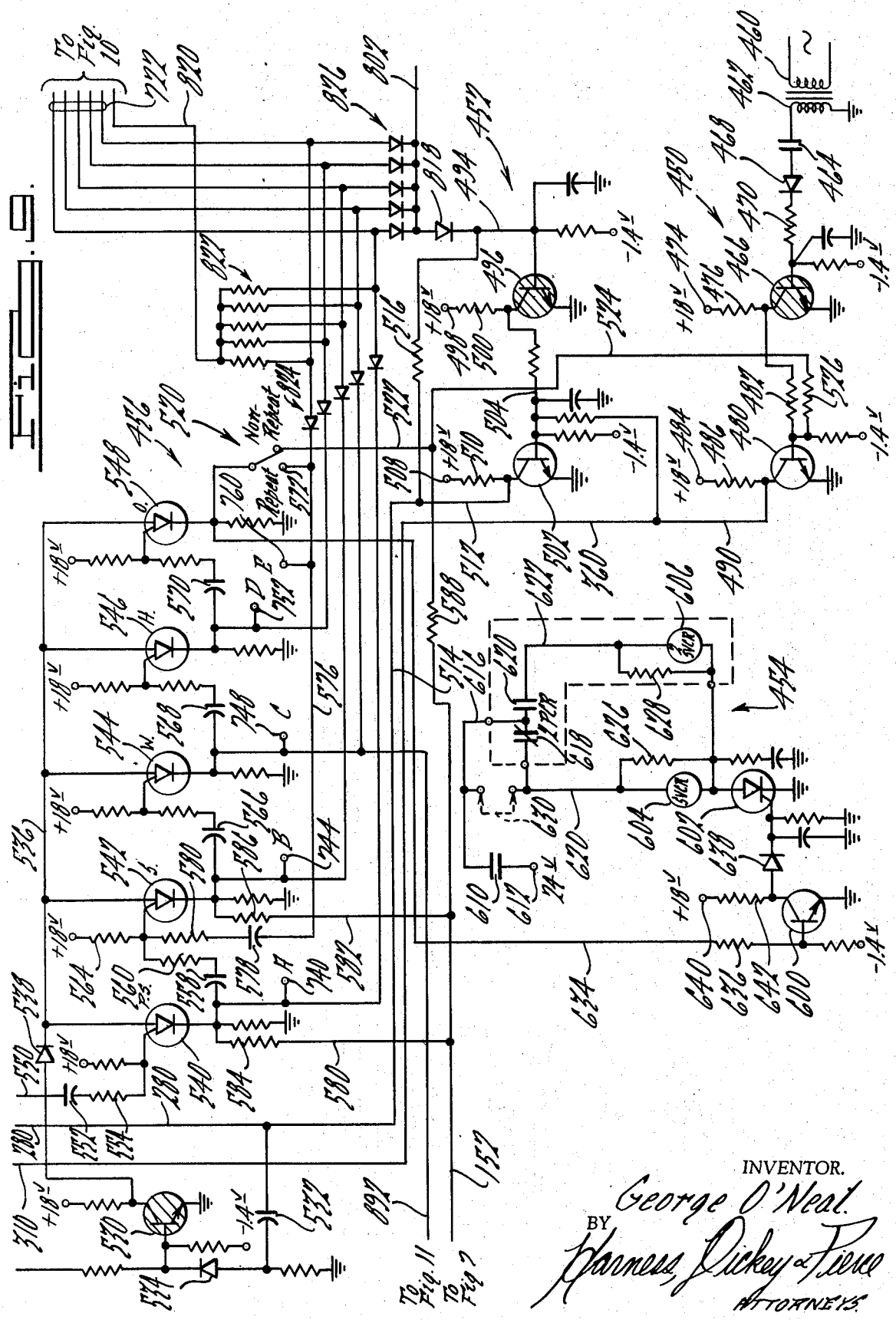
FIG. 9 is a schematic representation of another portion of the electrical control circuit of FIG. 7.

A pair of contacts 166 controlled by the energization of the PCR relay coil 130 enables a normally conductive transistor 150, the transistor ultimately being rendered conductive by means of a signal on an input conductor 152 connected to a circuit to be described in conjunction with FIG. 9, the signal on conductor 152 indicating the occurrence of the presqueeze, squeeze and off portions of the sequence, the off portion only rendering the transistor 150 conductive during the non-repeat mode of operation. However, during the weld, hold and off (repeat mode) portions of the cycle, the transistor 150 is rendered non-conductive to cause transistor 156 to conduct. The transistor 156 is connected, through its collector-emitter circuit, between a 24 volt potential at input terminal 158 and ground at 160 through a resistor 162. However, the current conducting path through both transistors 150 and 156 are controlled by normally open PCR contacts 166, the contacts being closed when the PCR relay 130 is energized.

Thus, upon energization of PCR relay 130, and thus the 2SCR relay 142, current will either flow through the collector-emitter circuit of transistor 150 or the collector-emitter circuit of transistor 156 depending on the portion of the welding cycle which is occurring and whether the system is in the repeat or non-repeat modes of operation. During the weld, hold and repeat-off portions of the cycle, the transistor 156 latches PCR relay 130 and 2SCR relay 142 in the energized state through the closed contacts 144. Upon achieving the presqueeze or squeeze modes of operation, or the off portion in the non-repeat mode of operation, the transistor 150 is again rendered conductive to ground the base-emitter circuit of transistor 156. Thus, the source of energy is removed from relays 130 and 142.

The system of the present invention is a two pilot system in the sense that it is capable of controlling two separate guns or the same gun for two separate programs. To this end, a second pilot control relay 170 is provided, the control relay being by a circuit including a second program pilot switch 172 and a conductor 174 connected to the input source of direct current electrical energy at terminal 132. Accordingly, if the first program is not being operated at that particular time, the second program pilot switch 172 may be closed to energize the relay 170 through a normally closed PCR set of contacts 176. The energization of the relay 170 closes a first and second set normally open contacts 180, 182 to complete a path from ground, through the relay 170, the contacts 180, 182, and a conductor 186 to the source of energy provided through the collector-emitter circuit of transistor 156.

However, if the first program is being operated at the time the second program pilot switch 172 is closed, the normally closed contacts 176 are open to inhibit the operation of the 2PCR relay 170. It is to be noted that, if both the first and second program pilot switches 128, 172 are closed, only the first program will be run due to the fact that the contacts 176 are open.

The circuit 126 also provides an output indication of whether the first or second program is being signaled. Particularly, a normally non-conductive transistor 192 is connected between a source of 18 volt potential at input terminal 194 and an output terminal at 196. The base-emitter circuit of transistor 192 is controlled by means of a signal fed thereto by means of a resistor 198, the base also being connected to a negative source of direct current potential through a resistor 200. If the second program pilot is not being utilized, a substantially ground potential or negative signal is fed to the base circuit of transistor 192 to render the transistor non-conductive. Thus, the signal on output terminal 196 will be approximately 18 volts or such voltage as would appear at the collector of transistor 192 when the transistor 192 is non-conductive. The output of transistor 192 is also fed to a normally conductive transistor 204 through a resistor 206. With transistor 192 non-conductive, a substantially positive signal is fed to the base electrode of transistor 204 to render the transistor conductive. Thus, current will flow from an input source of potential at terminal 206 through the collector-emitter circuit of transistor 204 to ground. An output terminal 210 is connected to the collector electrode of transistor 204 to provide an indication that the first program is being utilized when the transistor 204 is conductive, the signal at terminal 210 being approximately ground potential during the first program. On the other hand, if the relay 170 is energized, a positive signal will be fed to the base electrode of transistor 192 to render the transistor conductive and ground the output terminal 196. Further, the grounding of output terminal 196 will also ground the base electrode of transistor 204 to render the transistor non-conductive. This will raise the potential at output terminal 210 to approximately 18 volts. Thus, an indication that the second program is being utilized will be provided to the remainder of the circuit.

Referring to the lower portion of the circuit, the PCR contacts 166 controls the energization of a non-weld control relay 214 through a weld/no-weld switch 216. Thus, if PCR contacts 166 are closed, during the weld, hold and off (repeat) portions of the cycle, a positive potential will be fed by means of a conductor 218, through the switch 216 to the control relay 214.

Figure 8:
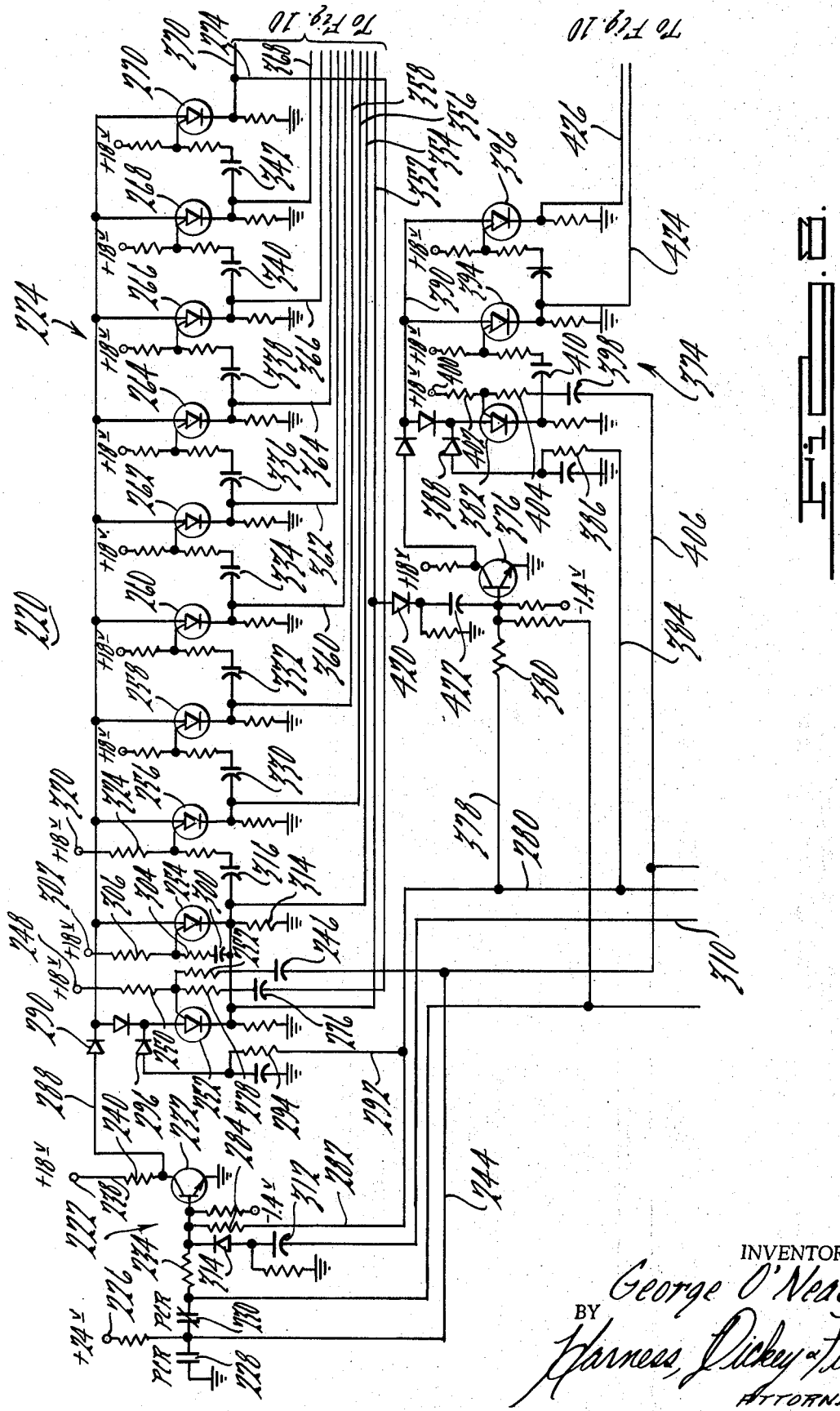
FIG. 8 is a schematic representation of still another portion of the circuit of FIG. 7.

Referring now to FIG. 8, there is illustrated a ring counter circuit 220 which includes an input section 222 and a ring counter 224. The input section includes a source of 24 volt electrical energy at input terminal 226 which is connected to a pair of normally open PCR relay contacts 228 and a pair of normally closed PCR contacts 230. The contacts 228 are grounded at one terminal thereof and the contacts 230 are connected to the base electrode of an input transistor 232 through a resistor 234. The collector-emitter circuit of the transistor 232 are connected to a source of 18 volt potential at input terminal 238 through a resistor 240.

When the PCR relay 130, FIG. 7, is energized, the contacts 230 are open and the contacts 228 are closed. The closing of contacts 228 ground conductor 244, thus providing a ground at one end of a capacitor 246. The other end of the capacitor 246 is connected to a source of 18 volt potential at terminal 248 through a pair of resistors 250 and 252. Thus, the capacitor 246 is permitted to charge from the 18 volt potential at terminal 248 when the contacts 228 are closed.

The ring counter 224 basically comprises a series of 10 programmable unijunction transistors 252–270 which are interconnected together to form the counter whereby input pulses are successively transferred in sequence from one programmable unijunction transistor to the next. The output of the final transistor 270 is fed back to the input of the initial unijunction transistor 252 by means of a feedback conductor 274, a capacitor 276 and a resistor 278. Thus, as will be seen hereinafter, the transferring of the pulses from the next to last stage, including transistor 268, to the final transistor 270 sets up the circuit to reactivate the initial input transistor 252. Upon sensing the next pulse, from the transistor 232, the final transistor 270 is extinguished and the initial transistor 252 is energized.

Particularly, the circuit is initially reset by means of a high voltage, greater than 18 volts, potential being impressed on an input conductor 280, this pulse being fed to the input circuit of transistor 232 by means of a conductor 282 and a resistor 284. This pulse causes transistor 232 to conduct thereby lowering the potential of a common conductor 286 through a conductor 288 and a diode 290. The lowering of the potential at conductor 286 removes the anode voltage from the unijunction transistors 254–270. Simultaneously, this pulse is also fed to the anode circuit of a unijunction transistor 252 by means of a conductor 292, a resistor 294 and a diode 296. The unijunction transistors are such that, when the anode voltage exceeds the gate voltage, the unijunction transistors will conduct. With the large voltage being fed to the anode of transistor 252 by means of diode 296, the anode voltage of the transistor 252 will exceed the gate voltage, this latter voltage not being able to exceed 18 volts.

With the unijunction transistor 252 conducting, the voltage at the cathode thereof is approximately 18 volts, the voltage at conductor 286, and this voltage is fed to a capacitor 300, the other end of the capacitor being coupled to a source of 18 volt potential at 302 through resistors 304 and 306. The connection between the resistors 304 and 306 is connected to the gate electrode of transistor 254. Thus, during the period that the transistor 252 is conductive, the capacitor 300 will have a zero charge, and thus zero potential across it.

When the clock pulses are produced in the circuit to be described in conjunction with FIG. 9, these pulses are impressed on input conductor 310. The pulses on conductor 310 are fed to the base electrode of transistor 232 by means of a capacitor 312 and a diode 314 wherein the capacitor 312 acts as a differentiator and the diode 314 selects the polarity of the pulse which is being fed to the transistor 323. This pulse is of such polarity as to render the transistor 232 non-conductive, thereby lowering the potential at conductor 286 to nearly ground potential.

The lowering of the potential at 286 to ground potential causes all of the unijunction transistors 252–270 to be extinguished. Upon the extinguishment of transistor 252, the capacitor 300 commences charging from the source 302. When energy is restored to the conductor 286, the unijunction transistor 254 is provided with a voltage at the anode electrode which is greater than the voltage at the gate electrode. Thus, the unijunction transistor 254 will commence conduction from the anode-cathode electrode circuit to ground through a resistor 314. The transistor 252 will remain non-conductive due to the fact that the voltage at the gate electrode of the transistor 252 will be approximately 18 volts due to the charge on the capacitor 276. The potential applied to the anode electrode of transistor 252 will be somewhat less than 18 volts due to the drop created by resistor 240 and diode 290. Thus, the transistor 252 will be extinguished and the transistor 254 will be conductive.

It is to be noted that the transistor 256 will not conduct because the potential at the left side of a capacitor 316 is at approximately 18 volts and the right side of the capacitor 316 is also at 18 volt potential because of the connection to the source 320. Thus, the anode electrode of the transistor 256 will not exceed the voltage at the gate electrode to permit the transistor 256 to conduct.

Upon the second clock pulse being fed from conductor 310 to the transistor 232, the voltage at conductor 286 will again drop to very nearly ground potential to extinguish all of the unijunction transistors 252–270. Upon occurrence of this event, the capacitor 316 will commence charging from the source at 320 but will be at a voltage much less than 18 volts due to the drop created by resistor 324. For the reasons explained above, upon reapplication of a positive source of potential to conductor 286, the transistor 254, and 252, will remain non-conductive and the transistor 256 will commence conduction.

The conduction of the unijunction transistor 256 will be subsequently passed through the transistor 258 when the potential at conductor 286 is again lowered by means of a clock pulse fed to the transistor 232. As was the case previously, a capacitor 330 interconnects the cathode electrode of unijunction transistor 256 and the gate electrode of unijunction transistor 258. During the time that the unijunction transistor 256 is conductive (the count has reached transistor 256), the capacitor 330 has collected a zero charge and the gate electrode of transistor 258 is approximately 18 volts. Upon dropping the potential of conductor 286, the unijunction transistor 258 will conduct.

Similarly, capacitors 332, 334, 336, 338, 340 and 342 control the conduction of transistors 260, 262, 264, 266, 268 and 270, respectively. Upon the conduction of transistor 270, the conductor 274 is raised to a positive 18 volt potential, this potential being fed back to the input circuit of the gate electrode through a capacitor 276 and the resistor 278. However, the potential being fed to the gate electrode of transistor 252, by means of capacitor 276 and resistor 278, is less than the potential being fed to the anode electrode of transistor 252 by means of conductor 288 and diode 290. Thus, the unijunction transistor 252 will commence conduction and the unijunction transistor 270 will be extinguished.

Upon resetting of the system, a reset pulse is fed to the circuit 222 and 224 by means of conductor 280 to cause unijunction transistor 252 to conduct and all of the other transistors 254 to 270 to be extinguished due to the dropping of the collector potential, and thus the potential of conductor 286, by means of the resetting pulse being fed to the base electrode of the transistor 232.

The conductive and non-conductive states of the various unijunction transistors 252–270 are sensed by means of a plurality of conductors 352–370 corresponding to the conduction of transistors 252–270. The signals on these conductors are fed to a coincidence circuit to be described in conjunction with FIG. 10. It is to be noted that the circuit 224 is a ring counter to count the zero to ten digits and the tens and hundreds sequence are counted by means of a counter circuit 374.

It is to be noted that the circuit 374 is very similar to the circuits 222 and 220 described above with the exception that only three digits are counted in the system of the circuit 374 and there is no feedback loop to render the circuit a ring counter.

Specifically, the circuit is initially reset by the reset pulse on conductor 280, the reset pulse being fed to an input transistor 376 by means of a conductor 378 and a resistor 380. The reset pulse is also fed to the anode electrode of a programmable unijunction transistor 383 by means of a conductor 384, a resistor 386 and a diode 388. Thus, as was described above, the reset pulse on conductor 280 will cause transistor 376 to conduct to lower the potential at a common conductor 390. Also, the reset pulse impresses a large positive potential on the anode electrode of unijunction transistor 382 to cuase a unijunction transistor 382 to conduct. The lowering of the potential on conductor 390 causes the second and third unijunction transistors 394, 396 respectively to be rendered non-conductive. A capacitor 398 is charged from a source of direct current potential 226 through conductors 244, 406. This voltage is grounded by the closure of contacts 228 to insure starting or the initial reset state of the unijunction transistors 382 and 352.

When the contacts at 228 are closed, and the contacts at 230 are open, the conductor 406 is grounded. Subsequent clock pulses on conductor 310 causes the pulse on unijunction transistor 252 to move on to subsequent unijunction transistors 254–270. When the unijunction transistor 252 is again rendered conductive, due to the fact that the conductor 274 has been energized, a pulse will be fed to the input circuit, including the base electrode, of transistor 374 by means of the resistor 380. This will lower the voltage of conductor 390 to cause all of the unijunction transistors 382, 394 and 396 to extinguish. As was the case above, a capacitor 410 interconnecting the cathode electrode of unijunction transistors 382 and the gate electrode of transistor 394 is not charged. However, upon the extinguishing of transistor 382, the capacitor 410 starts charging thereby lowering the voltage at the gate electrode of transistor 394. Upon the reapplication of the voltage to conductor 390, the anode electrode will be at a greater potential than the gate electrode thereof, due to the fact that the capacitor 410 is not completely charged, and the unijunction transistor 394 will commence conduction.

However, as was the case above, the anode voltage being fed to the anode of unijunction transistor 382 is insufficient to cause conduction of transistor 382. Thus, when the system 224 counts the first ten digits, the pulse will be moved from the conductive transistor 382 to the tens transistor 394. Upon completion of the counting of the second ten pulses from the clock pulse circuit, the conductor 274 will be again rendered energized and a pulse will be fed to the transistor 374 by means of the energization of conductor 352. This pulse is fed to the transistor 376 by means of a diode 420 and a capacitor 422. Thus, the pulse counting is moved from transistor 394 to transistor 396. The count on the transistor 394 and 396 are fed to the coincidence program circuit by means of conductors 424 or 426 respectively, this circuit to be described in conjunction with FIG. 10.

Referring now to FIG. 9, there is illustrated the control circuitry for the system of the present invention. More particularly, this circuit of FIG. 9 includes a clock generating circuit 450, a coincidence circuit 452, a valve control circuit 454 and a welding sequence control circuit 456. This latter circuit 456 sequences the system through the presqueeze, squeeze, weld, hold and off portions of the welding sequence in response to the sensing of either the start of the sequence by means of the energization of the PCR relay or the sensing of coincidence through the counting of a particular, preselected number of pulses generated in the clock circuit.

Referring particularly to the clock circuit 450, line frequency pulses are fed to the clock circuit by means of a transformer, including a primary winding 460 connected to a source of alternating current energy, the primary winding 460 being magnetically coupled to a secondary winding 462 through a magnetic core. As was stated above, when the first pilot switch is closed, the pilot control relay PCR is energized and, upon sensing pressure through the pressure switch, the 2SCR relay is energized. The energization of the 2SCR relay will close a pair of normally open 2SCR contacts 464 to couple the secondary winding 462 to a transistor 466 through a diode 468 and a resistor 470. The collector-emitter circuit of the transistor 466 is coupled to a source of direct current energy at input terminal 474 through a resistor 476. Thus, when a positive pulse is fed through diode 468, the transistor 466 will be rendered conductive. Contrariwise, the non-conduction of transistor 466 will occur when either a negative pulse is being fed from the secondary winding 462 or no energy is being fed to the transformer.

The collector electrode of transistor 466 is coupled to the base electrode of an output clock transistor 480 through a resistor 482. As was the case with transistor 466, the collector emitter circuit of transistor 480 is coupled to a source of electrical energy at 484 through a resistor 486.

Thus, when a positive pulse is fed from secondary winding 462, the transistor 466 will be rendered conductive and the transistor 480 will be rendered non-conductive. This will place a positive DC potential on an output conductor 490, the output conductor 490 being connected to the conductor 360 described in conjunction with FIG. 8. On the other hand, the opposite condition is true and a substantially zero level pulse is impressed on conductor 490 when a negative pulse is provided from a secondary winding 462.

Referring now to the coincidence circuit, when coincidence occurs at the preselected count of pulses for a particular portion of the welding sequence, a signal is generated on an input conductor 494, which signal is fed to a transistor 496, the coincidence signal being such as to cause conduction of transistor 496 at coincidence. The collector-emitter circuit of transistor 496 is connected to a positive source of potential at terminal 498 through a resistor 500. The collector electrode of transistor 496 is coupled to a base electrode of an output transistor 502 through a resistor 504, the conduction of transistor 496 grounding the base electrode to cause the transistor 502 to become non-conductive.

The collector-emitter circuit of transistor 502 is provided with a positive source of potential at input terminal 508 through a resistor 510 such that the collector electrode is at approximately 18 volts when the transistor 502 is non-conductive and approximately ground potential when the transistor 502 is conductive. This signal level on the collector electrode is fed to an output conductor 512 to provide a coincidence signal on a conductor 514. Also, the conductive condition of transistor 502 is fed back to the transistor 496 by means of a resistor 516 and the conductor 494 such that, when the transistor 496 is conductive, an 18 volt signal will be fed back to the base electrode thereof by means of conductor 512, the resistor 516 and the conductor 494 to maintain the transistor 496 in the conductive state. The coincidence signal impressed on conductor 494 will be described more fully in conjunction with the remaining portion of the circuit of FIG. 9 and the circuit of FIG. 10.

In the non-repeat mode of operation, wherein it is desired not to repeat the complete welding cycle, a clock inhibiting signal is generated from a non-repeat switch 520 which provides a positive signal on a conductor 522 and a second conductor 524, this latter conductor being connected to the base electrode of the transistor 480 through a resistor 526. Thus, when the off portion of the cycle, as will be more fully explained hereinafter, is achieved, a positive signal is impressed on the armature portion of the switch 520 to bias the transistor 480 in the conductive state and maintain that conductive state until the circuit is either reset or the switch 520 is transferred to the repeat mode of operation.

Referring now to the welding control circuit the coincidence pulse on conductor 512 is fed by means of the conductor 514, to the input circuit of a transistor 530 through a capacitor 532 and a diode 534. Particularly, at coincidence, when the transistor 502 is conductive, a positive signal is impressed on conductors 512 and 514 and the base electrode of transistor 530 to cause the transistor to conduct. This signal is fed to a common anode conductor 536 by means of a diode 538 to lower the potential of the conductor 536 at coincidence. As will be seen from a further description of the circuit 456, the achieving of coincidence causes the circuit 456 to sequence the pulse from a pre-squeeze programmable unijunction transistor 540, to a squeeze transistor 542, to a weld transistor 544, to a hold transistor 546, and finally to an off transistor 548.

Initially, the pilot relay closes the normally open contacts 228 described in conjunction with FIG. 8 and this provides a grounding signal on conductor 406. The grounding of conductor 406 generates a ground potential signal on an input conductor 550 to lower the potential of the gate electrode of the unijunction transistor 540 through a capacitor 522 and a resistor 554. The lowering of the gate electrode will start the presqueeze programmable unijunction transistor 540 to conduct and initially start the welding cycle.

The circuit 456 is substantially similar to the circuit described in conjunction with FIG. 8 in the manner in which the pulse is transferred from the presqueeze programmable unijunction transistor 540 to the squeeze programmable unijunction transistor 542, etc. As was the case with the ring counter, a capacitor 558 is coupled between the cathode of transistor 540 and the gate electrode of transistor 542 through a resistor 560. Thus, when the presqueeze transistor 540 is conductive, a large positive voltage will be impressed on the left side of capacitor 558 which is approximately the same voltage as applied to the right side through resistor 560 and a resistor 564. However, when the transistor 540 is extinguished, the capacitor 558 will commence charging, the initial charging portion lowering the gate electrode voltage to a point where the squeeze transistor 542 will conduct.

Similarly, the capacitor 566 couples the cathode electrode of transistor 542 with the gate electrode of transistor 544, capacitor 568 couples the respective electrodes of transistors 544 and 546 and capacitor 570 couples transistors 546 and 548.

If the system is to be utilized in the repeat mode of operation, the switch 520 is transferred to the repeat terminal 572, which causes the output of unijunction transistor 548 to be fed back through a conductor 576 to the input circuit of the squeeze unijunction transistor through a capacitor 578 and a resistor 580. In the repeat mode of operation, it is seen that the presqueeze period is not utilized. The sensing of the circuit being in the presqueeze squeeze or non-repeat modes of operation for use by the circuit of FIG. 7, as fed thereto by conductor 152, is fed by means of conductors 580, 582 and 522 and resistors 584, 586 and 588 respectively.

Referring now to the valve circuit 454, there is provided a control transistor 600 which is connected in controlling relation with a silicon controlled rectifier 602. The silicon controlled rectifier 602 is connected in series circuit with a first valve control relay 602 which is utilized to operate the valve connected with the first pilot system, and a second valve control relay 66 which is connected to operate with the second pilot circuit.

In the embodiment of the system of the present invention described above, it is preferable to energize the valve control relays from the time the pilot control relay has been closed until the time that the off period has been sensed. Thus, a pilot control relay set of contacts 610 are connected to a source of 24 volt alternating current potential at input terminal 612 and the other end of the normally open contacts 610 are connected to control the application of the alternating current at terminal 612 to the valve control relays 604, 606.

When the first pilot has been selected, the contacts 610 are closed and current will flow from the 24 volt source at input terminal 612 through conductor 616, through a pair of normally closed contacts 618, through a conductor 620 and finally through the control relay 604 in the event that the silicon controlled rectifier 602 is conductive. It will be noted that the normally closed contacts 618 are controlled by the 2PCR relay which is energized in response to the selection of the second pilot system.

In the event the second pilot system is selected, the first pilot control relay has been energized and contact 610 will be closed. However, upon completion of the first pilot sequence, the second pilot relay will be energized to open normally closed contacts 618 and close a set of normally open contacts 62. Thus, during the second portion of the dual pilot system, energy will flow to the second valve by means of a conductor 622 and the conductive control relay 602. Kickback resistors 626 and 628 have been provided as is common in the art. In the event the first pilot system is to be selected with each operation, a jumper 630 may be provided to permanently connect conductor 616 to the conductor 620 irrespective of the operation of the 2PCR relay.

As was stated above, the valves are not to be operated during the off period and an off signal is generated on a conductor 634 from the cathode circuit of the control rectifier 548. This signal is fed to the base electrode of transistor 600 by means of a resistor 636. Upon achieving the off portion of the welding cycle, a relatively high voltage will be impressed on conductor 634, thus causing transistor 600 to conduct. The conduction of transistor 600 will ground the gate electrode of controlled rectifier 602 through a circuit including diode 638 and the collector-emitter circuit of the transistor 600. However, when the off control rectifier 548 is non-conductive, the conductor 634 will be provided with ground potential to cause transistor 600 to become non-conductive. This condition will feed a relatively high direct current potential to the gate electrode of control rectifier 602 from the terminal 640, the resistor 642 and the diode 638. This will cause conduction of the control rectifier 602 in the event that the PCR relay is energized and normally open contacts 610 are closed.

Figure 10:
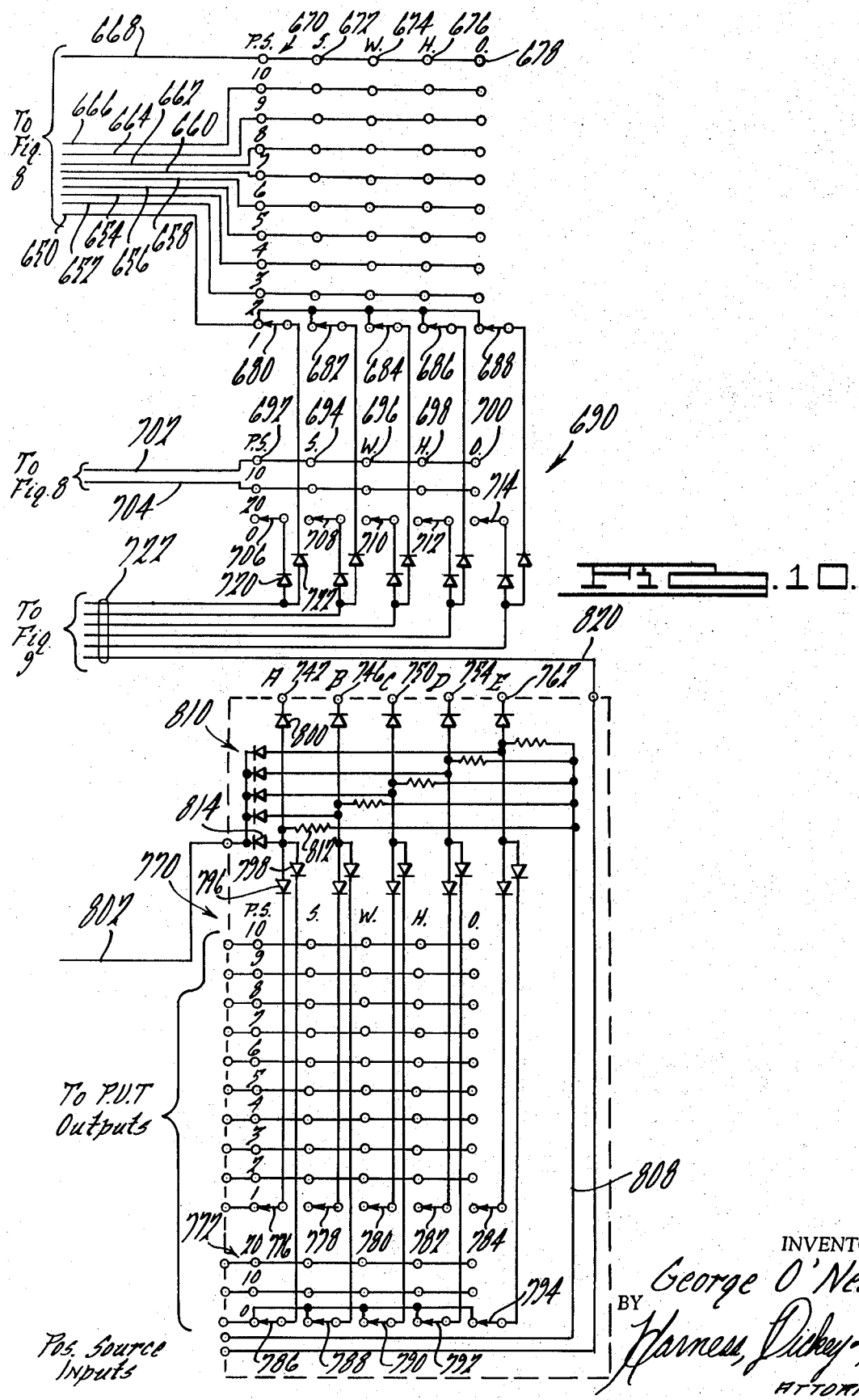
FIG. 10 is a schematic representation of another portion of the electrical control circuit of FIG. 7.

Referring now to FIG. 10, there is illustrated the interconnecting circuitry between the counter circuit of FIG. 8 and the coincidence circuit utilized to control the clock pulsing system of FIG. 9. Specifically, conductors 650 to 668 are interconnected with the first through tenth stages of the counter circuit described in conjunction with FIG. 8. A plurality of rows of switch contacts 670, corresponding to the presqueeze mode of operation, 672 corresponding to the squeeze mode of operation, 674 corresponding to the weld mode of operation, 676 to the hold mode and 678 to the off mode, are selectable by switch armatures 680 to 688 respectively. Thus, when it is desired to select a particular zero to ten count for the presqueeze mode of operation, the armature 680 is moved to one of the terminals 670 corresponding to the selected count. Similarly, armature 682 is moved through the switch contacts 672, etc.

The tens and twenties counter are interconnected with the lower section 690 which are similarly provided with presqueeze, squeeze, weld, hold and off switch contacts 692, 694, 696, 698 and 700 respectively. The terminals are connected to the tens portion of the counter by means of a conductor 702 and the twenties counter is interconnected with the switch terminals by means of a conductor 702. The particular 10 or 20 or 0 count is selected by a plurality of presqueeze, squeeze, weld, hold and off armatures 706, 708, 710, 712 and 714 respectively. Thus, if in the presqueeze mode of operation it is desired to select a count of 26, the armature 680 is moved up to the 6th terminal 670 and the armature 706 is moved up to the 20 terminal 692.

When the desired count is achieved, a pair of diodes 720 and 722 are back biased, due to the fact that the positive signal is impressed on armatures 706 and 780, which presents a zero signal on conductor 722.

Referring to the lower portion of FIG. 10, it is seen that there is provided a duplicate set of contacts for the second of the dual program system which is substantially identical to that described above. Specifically, the cathode of the presqueeze control rectifier 540 is interconnected with the circuit of FIG. 10 by providing a connection between the plug 740 connected to the cathode of the control rectifier 540 and an input plug 742. Similarly, control rectifier 542 is interconnected by providing a conductor between plug 744 and plug 746. The weld and hold operations are sensed by providing an interconnection between plugs 748 of FIG. 9 and 750 of FIG. 10 and 752 of FIG. 9 and 754 of FIG. 10 respectively. The off portion of the cycle is sensed by providing a signal from the cathode of the off controlled rectifier 548, through the repeat portion of the switch 520 to the conductor 576. The connection is then made between a plug 760 and a plug 762. As will be seen from a further description of FIGS. 9 and 10, this plug board arrangement is slightly different in that the direct connections are not illustrated in the drawings. However, the connections will be seen to be identical to those supplied the system of the upper part of FIG. 10. It should be understood that a system will be provided to automatically select either the first or second program.

In a similar manner to that described above, a connection is provided between the programmable unijunction transistor outputs corresponding to the conductors 650 to 668 above to the input jacks 770 corresponding to counts one through ten of the counter 220. Counts zero, ten and twenty are supplied by a second pair of input plugs 772. Thus, when the proper count selection is made by moving one of the armatures 776, 778, 780, 782 or 784 to the selected 0 to 10 count for each function and the armatures 786 to 794 are moved for the 0, 10 or 20 count, coincidence will be achieved for the selected count for each portion of the welding cycle. The count will back bias, in the presqueeze mode for example, a pair of diodes 796, 798 respectively. The fact that the system is in the presqueeze mode of operation will back bias the diode 800. Thus, a signal will be provided on the output conductor 802 to indicate that the selected count has been achieved in the selected portion of the welding cycle. Obviously, the squeeze weld, hold and off operations are similarly operated. A positive potential supply input is provided by means of a conductor 808 to the circuit described above and is fed through a plurality of diodes 810 to the output circuit including conductor 802. Thus, if the above described diodes 796, 798 and 800 are back biased, an output signal will be provided through the resistor 812 and a diode 814.

The signal on conductor 802 is fed to the circuit of FIG. 9 specifically through a diode 818 conductor 494 to the transistor 496. This will cause transistor 496 to conduct and preclude any further clock pulses from being fed to conductor 360 as described above.

Referring to the first program of FIG. 9, count coincidence signals are fed to conductor 722 corresponding to the coincidence of the selected count in the presqueeze, squeeze, weld, hold and off portions of the cycle in the first program. Also, a positive supply signal is fed by means of a conductor 820 to the circuit of FIG. 9 to provide a positive signal at coincidence. The positive signal on conductor 820 is fed through a plurality of resistors 822 to a group of diodes 824, the diodes being connected at the cathodes thereof to the selected presqueeze, squeeze, weld, hold and off controlled rectifiers 540 to 548. The controlled rectifier which corresponds to the particular portion of the cycle which is occurring at the time the count is taking place will back bias the selected diode 824 to again provide a positive signal through a group of diodes 826 and the diode 818. This positive signal will raise the voltage of conductor 494 to cause transistor 496 to conduct. Again, this will preclude any further clock signals from being presented to conductor 360.

Referring now to FIG. 11, there is illustrated a heat control and firing circuit 830 which is adapted to control the firing of the output ignitrons during the weld portion of the cycle. Specifically, the circuit 830 includes an output firing circuit 832, the control of which is provided by a heat control circuit 834. Control of the operation of the heat control circuit is provided by a flip-flop 836, the flip-flop being utilized to select the various individual heat control circuits contained within the general heat control circuit 834.

As was explained above in conjunction with the description of FIG. 6, the system of the present invention includes a heat control circuit which generates a selectably variable, precharging wave form and a heat control wave form which is generated at the time of the switching of conduction of the ignitrons to provide the heat control necessary in welding systems of this type. Particularly, the system of the present invention generates a straight line wave form which starts at the zero voltage point and advances along a preselected line with a preset slope until such time as the reversal of the current across the ignitrons is sensed. At this time, the system generates a second straight line having a slope which is selected in accordance with the percent heat desired at the load. The slope of this latter line may be variably increased or decreased to achieve a range of heat from approximately 100 percent to zero heat respectively.

Referring particularly to the firing circuit 832 is seen that a pair of controlled rectifiers 840, 842 are connected between ground potential at the cathodes thereof and the opposite ends of a center tapped secondary winding 844 through a circuit including a diode 846, a resistor 848 and a pulse transformer 850. The control rectifier 842 is similarly connected through a diode 852, a resistor 854 and a primary winding of a second pulse transformer 856.

When a pulse signal is not being generated, the right side of the secondary winding of transformer 844 is grounded through a circuit including a resistor 860, a diode 862 and a resistor 864. Similarly, the left side of the secondary winding 844 is connected to ground through a resistor 866, a diode 868 and the resistor 864. Thus, zero current is flowing through the pulse transformers 850, 856 due to the non-conduction of controlled rectifiers 840 and 842. However, a small current flows through diode 846 and resistor 848 to ground to change a capacitor 870 and a second current path is provided through diode 852, resistor 854 to ground to charge capacitor 872. It will be noted that the capacitor 860 is charged on the opposite half cycle that capacitor 872 is charged and on the half cycle that control rectifier 840 conducts, this charging provides a sharp pulse through the pulse transformers 850, 856, as will be seen.

When it is desired to fire one of the controlled rectifiers 840, 842, the potential of a conductor 876 is raised sufficiently to back bias diodes 862, 868. This permits current to flow through the controlled rectifier 840 or 842 depending on the polarity of the line voltage being sensed by secondary winding 844. However, on opposite half cycles, current flows through the pair of diodes 878, 880 to charge a capacitor 882 to enable the controlled rectifier 840 by placing a positive signal on the gate electrode thereof. A similar situation exists on the other half cycle when current flows through diodes 884, 886 to charge capacitor 888.

When the diodes 862, 868 are back biased, and assuming the left side of secondary winding 844 is positive, current will flow through diode 846, resistor 848, pulse transformer 850 and controlled rectifier 840 to ground. Also, the capacitor 870 will discharge through the pulse transformer 850 to provide an additional current pulse. A similar situation occurs on the opposite half cycle through pulse transformer 856 and controlled rectifier 842. Thus, firing pulses are generated in the primary windings 850, 856.

Referring now to the heat control portion of the circuit 834, there is provided a weld signal on an input conductor 892 connected to the welding signal which comes from the weld controlled rectifier 544 discussed in conjunction with FIG. 9. This input signal is initiated at the start of the weld portion of the cycle and is fed through a potentiometer 896 and a resistor 898 to charge a capacitor 900. The RC time constant of the resistors 896, 898 and capacitor 900 provides the delayed firing common in systems of this type. Normally, the firing of the first cycle of the weld portion of the cycle is delayed by 87½°.

When the voltage on capacitor 900 is sufficient to breakdown a four layer voltage responsive device 902, current flows from the capacitor to a control transistor 906 through the voltage responsive device 902. The transistor 906 is connected in controlling relation with a voltage divider circuit including a pair of resistors 910, 912 and a potentiometer 914. The interconnection between the resistor 910 and the voltage divider 914 is connected to the control electrode of a programmable unijunction transistor 920 through a conductor 922. As was described above, the unijunction transistor will conduct when the cathode voltage exceeds the gate voltage. Prior to the 87½° point, the conductor 922 is maintained at a potential very near the potential of input terminal 924, which potential is greater than the potential at the cathode electrode of the unijunction transistor 920. However, when the transistor 906 conducts, the voltage on conductor 922 is lowered sufficiently to enable the unijunction transistor 920 to conduct if a proper voltage is present at the cathode electrode. The evolution of this proper voltage will be described hereinafter.

The conduction of the unijunction transistor 920 is controlled by the charge on a capacitor 930, the charge on the capacitor being derived from two sources, namely, a presetable fixed circuit 932 including a resistor 934 and a potentiometer 936. These two elements 934, 936 provide the resistance for the RC timing circuit, including capacitor 930, which generates the initial or precharge portion of the timing cycle, the current flowing through a diode 938 to charge the capacitor 930. Upon reaching the changeover in conduction of the ignitrons, the circuit 932 is switched out of circuit with the capacitor 930 and a first program circuit 940 is interconnected to charge the capacitor 930. The circuit 940 includes a resistor 942, a second resistor 944 and a potentiometer 946, the potentiometer 946 corresponding to the heat control resistor which may be adjusted in accordance with the percent heat desired by the operator. The system also includes a second variable heat control circuit 950 which is utilized in the second program of the system of the present invention. The circuit 950 is substantially identical to that described in conjunction with circuit 940 but further includes a clamping terminal 952 which is supplied with a clamping signal when the first program is operating.

Control of which heat control circuit 932 or 940 is being utilized is controlled by means of the circuit 836 whereby the node 956 or node 958 is clamped to ground during the period that the selective circuit is not to be utilized. For example, when the initial precharge portion of the weld cycle is in operation, the node 958 is clamped to ground through a diode 962 and a conductor 964 by means of the circuit 836. On the other hand, when the actual heat control is being utilized, the node 956 is clamped to ground through a diode 968 and a conductor 970. It will be noted that the second program is also controlled by means of a conductor 972 in the same manner that the first program heat control circuit 940 is controlled.

The grounding of the two conductors is controlled by the flip-flop circuit which includes a pair of transistors 980, 982 connected in the conventional flip-flop configuration. The flip-flop includes a first input from the secondary winding 984 of a center tapped transformer which is supplied from line voltage. Also, there is a second secondary winding 986 which is also center tapped and supplied with a signal from the transformer connected across the anodes of the ignitrons as described above.

Referring particularly to the secondary winding 984, it is seen that the ends of the winding 984 are connected to a pair of diodes 988, 990 to supply the negative half cycle of the wave to a resistor 992. However, the output end of the resistor is connected to a positive source of potential at 994 to bias the node 996 such that a slight spike of voltage appears through the diode 998. This positive voltage causes the transistor 980 to conduct each time the spike appears. The conduction of 980 also should turn off the transistor 982. However, this is delayed due to the fact that a capacitor 1000 is connected to the base electrode of the transistor 982 to create a slight delay in the operation of the transistor 982. Thus, for a short period of time, this period being extremely short, the two transistors 980 and 982 ground all of the conductors 964, 972 and 970. In this way, there is assurance that the programmable unijunction transistor 920 is non-conductive at the start of the half cycle. Thus, with the transistor 980 conductive and the transistor 982 non-conductive, the potential at an output conductor 1002 is very nearly ground potential thereby grounding the conductors 964, 972. This disables the first program heat control circuit 940 and the second program heat control circuit 950, whichever is being utilized at that time.

On the other hand, the transistor 982 is conductive to raise the potential of the conductor 970 to a high positive level. This high potential back-biases diode 968 to permit the capacitor 930 to be charged through a circuit including resistors 934 and 936 and diode 938. On the other hand, when the conductive ignitron is extinguished and the switching point is reached, this signal is sensed by the transformer 986 and fed to the base electrode of the transistor 982 to cause the transistor 982 to be conductive. The conduction of transistor 982 will immediately switch transistor 980 to the non-conductive state to raise the potential of the conductor 1002 to a high positive level. This high potential will cause diode 962 to be back biased to permit the circuit 940 to control the charging of the capacitor 930 through the circuit including potentiometer 946. This cycle will continue until the requisite number of counts have been achieved and the weld signal is lost from conductor 892. The loss of the weld signal will cause transistor 906 to become non-conductive to raise the gate voltage of the unijunction transistor 920. Thus, the unijunction transistor 920 is extinguished until the next heat cycle.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A control circuit for an electrical welding system having a source of alternating voltage and current half-cycles connected to an inductive welding load, the welding system including back-to-back connected controllable devices each of which conducts when actuated if the voltage applied there-across is of adequate amplitude and correct polarity and continues to conduct, once actuated, until the current therethrough and through the load drops below a certain value, the current through said devices and through the load lagging the voltage of the source while the voltage across said devices cannot change to the instantaneous source voltage value until the conductive one of the devices becomes nonconductive, the control circuit comprising heat control circuit means connected to the controllable devices including selectably variable means for applying a firing signal to the devices for actuating the controllable devices for the remainder of a selectable portion of the alternating current half-cycles to select a percent heat to be fed to the load, sensing transformer means connected to sense the conductive condition of the devices including means for producing a signal which changes with changes in the conductive condition of the devices, and control means connected to said heat control circuit means and the transformer means for inhibiting the actuation of the devices by the heat control means during appropriate of the alternate half-cycles of the alternating voltage source prior to said sensed condition, and removing said inhibiting of the actuation in response to the occurrence of said second condition at the time of or subsequent to said sensed condition.

2. The control circuit according to claim 1 wherein said conductive condition is the voltage across the devices.

3. A control circuit according to claim 2, wherein said sensing transformer means has a primary winding connected in parallel with said devices.

4. A control circuit according to claim 1, wherein said sensing transformer means transmits said signal each time that a conductive one of the devices becomes non-conductive, said control means being responsive to said signal.

5. A control circuit according to claim 4, wherein said control means actuates said devices by applying a pulse of electrical energy thereto, said control to disable the transmission of the said pulse until said signal is received from said sensing means.

6. A control circuit according to claim 5 wherein said control means includes for each of said controllable devices a solid state firing device, a direct current power supply connected to said firing device for supplying electrical energy to said firing device, and firing device enabling means connected to said firing device and said sensing transformer means for enabling said firing devices in response to said signal.

7. A control circuit according to claim 1 wherein said controllable devices are ignitrons.

8. A circuit according to claim 6 wherein each firing device includes energy storing means connected to said direct current supply for storing energy from said direct current power supply and discharging this energy as said applied pulse of electrical energy to one of said controllable devices.

9. A circuit according to claim 8 further including means for generating a weld condition signal, means responsive to the weld condition signal indicative that the welding system is prepared to weld and wherein the energy storing means is a capacitor which charges during the first cycle of the alternating current following operation of said weld condition signal generating means and discharges for the first time during the second cycle of the alternating current following the operation of said weld condition signal generating means.

10. The control circuit of claim 1 further including separate-excitation firing circuit means connected to the devices for applying said input signal to said devices in controlled phase relation to the source, the application of said input signal actuating said devices and adapted to apply controlled portions of the current half-waves to said welding load, and control means connected to said firing circuit means and a corresponding pair of said terminals, said control means being connected to enable said firing circuit means in response to the voltage between said corresponding pair of said terminals.

11. Circuit according to claim 10 wherein said devices are ignitrons.

12. Circuit according to claim 11 wherein said firing circuit means comprises a source of energy, said controllable devices including unidirectional current conducting devices having an input circuit, said firing circuit means being connected to the input circuit of the unidirectional devices and effective when actuated for applying a pulse of energy from said source of energy to the input circuit of the unidirectional current conducting devices.

13. Circuit according to claim 12 wherein said firing circuit further includes energy storing means for storing energy from said last named source of energy and discharging this energy as said applied pulse to said input circuit.

14. Circuit according to claim 13 further including signal responsive means connected to the said energy storing means, the charging of said energy storing means being controlled by said signal responsive means, means for generating a weld condition signal, and means connected to the weld condition signal generating means and the signal responsive means and responsive to the weld condition signal for signalling that the welding system is prepared to weld.

15. Circuit according to claim 14 wherein said source of energy further includes a transformer connected between the source of alternating current and the load, and a rectifying means connected between said transformer and said energy storing means, said signal responsive means connected to control the energization of the transformer by said alternating current source, said transformer being connected to said rectifying means to supply direct current energy to said energy storing means.

16. Circuit according to claim 15 wherein the energy storing means includes a capacitor which charges during the first cycle of the alternating current following the operation of said signal responsive means and which discharges for the first time during the second cycle of the alternating current following the operation of said signal responsive means.

17. Circuit according to claim 16 wherein said controllable devices include solid state devices.

18. Circuit according to claim 16 further including filter means connected between said energy storing means and said input circuit of the unidirectional current conducting devices for limiting the rate of energy discharge into said input circuit.

19. Circuit according to claim 18 wherein said filter means includes an inductance connected in the input circuit of the unidirectional current conducting devices.

20. Circuit according to claim 19 further comprising inhibiting means connected to said actuating means effective for a selectable period following the commencement of each half cycle for inhibiting the operation of said actuating means, and means for generating a weld initiation signal, means responsive to said initiation signal indicative of a weld interval and effective only during the first half cycle of the alternating current thereafter for inhibiting operation of said actuating means for a preselected period.

21. Circuit according to claim 20 wherein the inhibiting means includes means for inhibiting operation of said actuating means until the voltage applied to the unidirectional current conducting devices has reversed.

22. Circuit according to claim 23 wherein the inhibiting means is operated in synchronism with the source of alternating voltage for alternately inhibiting said actuating means to actuate the associated controllable means.

23. In a welding system having a source of alternating voltage and a load having a power factor, a resistance welding control system including connecting means for selectively connecting the load to the source of alternating voltage during each of at least certain of the half-cycles of the alternating voltage for each weld in accordance with a variably selectable percent heat, said system including a sensing means connected to the load for sensing the power factor of the load, and a heat control means connected to the sensing means and the connecting means, said heat control means including a timing curve generating means controlled by the sensing means for controlling the connection of the load to the source, said curve generating means generating a curve having a slope characteristic and including means for selectably varying said slope characteristic, said variable slope characteristic varying the selectably variable percent heat, said sensing means initiating the generation of the preselectable slope timing curve by the generating means and cooperating with said curve generating means for correcting for the power factor of the load in selecting the percent heat fed to the load.

24. A resistance welding control system according to claim 23, wherein said control system is connected to the connecting means to connect the load to the source during each of a succession of half-cycles of the source, said sensing means including means for connecting the sensing means to the load to sense the power factor of the load during each of a plurality of the half-cycles during a single weld.

25. A resistance welding control system according to claim 23, wherein the sensing means includes means to produce a signal indicative of the power factor of the load.

26. A resistance welding control system according to claim 25 wherein said control system is connected to the connecting means to connect the load to the source during each of a succession of the half-cycles of the source, and said sensing means produces a signal indicative of the power factor of the load during each of a plurality of said half-cycles during a single weld.

27. A resistance welding control system according to claim 25 wherein the power factor signal is indicative of the termination of the flow of current through the load.

28. A resistance welding control system according to claim 27 wherein the connecting means includes one or more controlled rectifier devices connected between the source of alternating voltage and the load, said heat control means being connected to said controlled rectifier devices to control the conduction of said devices, said sensing means sensing the voltage across the devices for producing said signal.

29. A resistance welding control system according to claim 28 wherein said controlled rectifier devices are rendered conductive and non-conductive in periodic relation with said source of alternating voltage and said characteristic of the said signal indicative of the power factor of the load being transmitted when said controlled rectifier devices become non-conductive.

30. A resistance welding control system according to claim 29 wherein said one or more controlled rectifier devices are a pair of back-to-back connected controlled rectifier devices which are alternately conductive.

31. A resistance welding control system according to claim 30 wherein said controlled rectifier devices are rendered conductive during alternate half-cycles of the source of alternating voltage with each becoming non-conductive before the other becomes conductive, said signal indicative of the power factor of the load being transmitted when either of the controlled rectifier devices becomes non-conductive.

32. A resistance welding control system according to claim 31 wherein the heat control means actuates the rectifier devices during opposite half-cycles of the alternating voltage source.

33. A resistance welding control system according to claim 32 wherein the welding load has an inductive reactance and the current through the devices and the load lags the source voltage, said heat control means actuating the devices during alternating half-cycles of the alternating voltage source at points in those half-cycles determined by the slope characteristic and the initiating of generation of the timing curve.

34. A resistance welding control system according to claim 23 wherein the controllable rectifier devices conduct when actuated and continues to conduct until the current therethrough and through the load drops below a certain value, said devices having a characteristic in which the voltage across the devices cannot change to the instant source voltage value until the conductive one of the rectifier devices becomes non-conductive and in which the sensing means detects the change in voltage across the devices.

35. A resistance welding control system according to claim 34 wherein the sensing means includes a transformer connected across the devices.

36. A resistance welding control system according to claim 35 wherein the transformer produces a signal which changes with changes of the voltage across the devices, and the heat control means is controlled by the transformer for actuating the rectifier devices during the half-cycles of the alternating voltage source which permit forward conduction of one of the rectifier devices.

37. A resistance welding control system according to claim 36 wherein the transformer has a primary winding connected across the devices, the transformer being connected to transmit a preselected signal each time that a conductive one of the devices becomes non-conductive, said control means being responsive to the preselected signal.

38. A resistance welding control system according to claim 37 wherein said control means includes means for actuating the devices by applying a pulse of electrical energy thereto, and in which the control means is disabled to transmit the pulse until the preselected signal is received from the sensing means.

39. A resistance welding control system according to claim 38 wherein the control means includes a capacitor and a capacitor discharge firing circuit, said capacitor being charged from said source during one half-cycle of the source voltage and being selectively discharged through said capacitor discharge circuit to produce actuation of one of the devices during the next half-cycle of the source voltage, and further including means for preventing discharge of the capacitor until the sensing means produces said preselected signal.

40. A resistance welding control system according to claim 39 wherein the control means includes timing means for delaying the actuation of the devices for a selected interval following the initiation of timing, said control means includes means connected to said capacitor and said curve generating means for preventing said capacitor from discharging even after the selected interval unless the sensing means has detected the preselected voltage change.

41. A resistance welding control system according to claim 23 wherein said heat control further includes means connected to said curve generating means for producing a signal having a fixed level, and means connected to said curve generating means and said fixed level producing means for comparing the magnitude of the curve to said fixed level and generating an output signal when the magnitude of said curve bears a preselected relationship to said fixed level.

42. A resistance welding control system according to claim 41 wherein said heat control means includes means connected to the source for sensing the polarity of selected half-cycles of the alternating voltage and generating a signal indicative of the attainment of the selected relationship between the timing curve and the said reference level and a preselected polarity.

43. A resistance welding control system according to claim 42 further including means connected to said connecting means for feeding said last-named signal to said connecting means to connect the load to the source.

44. A resistance welding control system according to claim 43 wherein said last-named signal is a firing pulse for causing conduction of said controlled devices connected between the source and the load so that the load is supplied with a preselected portion of the alternating voltage indicative of the percent heat.

45. In an electrical welding system having a source of alternating voltage and current half-cycles connected to an inductive welding load, the welding system including a pair of back-to-back connected controllable devices each of which conducts when actuated if the voltage applied there-across is of adequate amplitude and correct polarity and continues to conduct, once actuated, until the current therethrough and through the load drops below a certain value, the current through said devices and through the load lagging the voltage of the source while the voltage across said devices cannot change to the instantaneous source voltage value until the conductive one of the devices becomes non-conductive, the method of controlling the system including the steps of applying a firing signal to the devices which is variable in time relative to the current half-cycles for actuating the controllable devices for the remainder of a selectable portion of the alternating current half-cycles to select a precent heat to be fed to the load, sensing the conductive condition of the devices, producing a control signal which changes with changes in the conductive condition of the devices, inhibiting the actuation of the devices during appropriate alternate half-cycles of the alternating voltage source prior to the sensed condition, and removing said inhibiting of the actuation in response to the occurrence of said sensed condition at the time of or subsequent to said sensed condition.

46. A method according to claim 45 wherein said conductive condition is the voltage across the devices.

47. A method according to claim 46 wherein said system includes a sensing transformer means having a primary winding connected in parallel with said devices, wherein the step of producing the control signal includes transmitting the control signal from the transformer means each time that a conductive one of the devices becomes non-conductive.

48. A method according to claim 47 wherein the step of actuating said devices includes applying a pulse of electrical energy thereto and disabling the transmission of said pulse until said control signal is received from said sensing means.

49. In a resistance welding system for selectively connecting a load having a power factor to a source of alternating voltage during each of at least certain of the half-cycles of the alternating voltage for each weld in accordance with a variably selectable percent heat, a method of controlling the welding system comprising the steps of sensing the power factor of the load, controlling the connection of the load to the source by generating a curve signal having a selectably variable slope characteristic, varying the slope characteristic of the curve for selecting the desired percent heat, sensing when the curve reaches a preselected magnitude, connecting the source to the load when the magnitude reaches the preselected magnitude, and initiating the generation of the variable slope curve in response to the sensed power factor for correcting for the power factor of the load.

50. A method according to claim 49 further including connecting the load to the source during each of a succession of half-cycles of the source and sensing the power factor of the load during each of a plurality of the half-cycles during a single weld.

51. A method according to claim 50 further including producing a control signal indicative of the power factor of the load, and wherein the step of initiating the generation of the variable slope curve is in response to the control signal.

52. A method according to claim 51 wherein the control signal is indicative of the termination of the flow of current through the load.

53. A method according to claim 51 wherein the control signal is indicative of the voltage across the device.

54. A method according to claim 53 wherein the welding system includes controlled rectifier devices connected between the source and the load, the step of controlling the connection includes selectively actuating the controllable rectifier devices a selectable interval after initiation of generation of the curve signal, the duration of said selectable interval determining the percent heat fed to the load, and controlling the initiation of generation of the curve signal in response to the control signal.

55. A method according to claim 54 wherein the controllable rectifier devices conduct when actuated and continue to conduct until the current therethrough and through the load drops below a certain value, in which the voltage across the devices cannot change to the instant source voltage value until the conductive one of the rectifier devices becomes non-conductive and in which the signal indicates the change in voltage across the devices, the method further including actuating the devices by applying a pulse of eletrical energy thereto, and disabling the transmission of the pulse until the control signal is received.

56. A method according to claim 55 further including delaying actuation of the devices for a selectable period following the initiation of generation of the curve signal.

57. A method according to claim 49 further including the steps of comparing the magnitude of the curve signal to a fixed level, generating an output signal when said curve signal bears a preselected relationship to said fixed level, and applying said output signal to connect the source of alternating voltage to the load.

58. A method according to claim 57 further including the steps of sensing the polarity of selected half-cycles of the alternating voltage and generating a signal indicative of the attainment of the selected relationship between the magnitude of the curve signal and the said fixed level and a preselected polarity.

59. A resistance welding control system including connecting means for selectively connecting a load having a power factor to a source of alternating voltage during each of at least certain of the halfcycles of the alternating voltage for each weld in accordance with a variably selectable percent heat, said alternating voltage having a characteristic that the current through the load lags the voltage and passes through a zero current point a period of time following the passage through zero of the voltage, said period of time defining the power factor of the load, said system including a sensing means for sensing the power factor of the load, and a heat control means connected to the sensing means and the connecting means including a timing curve generating means controlled by the sensing means for controlling the connecting means and, thus, the connection of the load to the source, said curve generating means generating a curve having a first portion and a second portion, said sensing means terminating the first portion and initiating the generation of the second portion by the generating means in response to the sensed power factor, and means connected to the curve generating means for altering a characteristic of said second portion for selecting the percent heat fed to the load.

60. A resistance welding control system according to claim 59 including means for connecting the load to the source during each of a succession of half-cycles of the source and in which the sensing means includes means for sensing the power factor of the load during each of a plurality of the half-cycles during a single weld.

61. A resistance welding control system according to claim 59 wherein the sensing means includes means for producing a signal indicative of the power factor of the load, and in which the heat control means is responsive to the signal.

62. A resistance welding control system according to claim 59 wherein the certain of half-cycles includes half-cycles of both polarities and said second portion characteristic is a selectably variable slope curve and said selecting means includes means for varying the slope of said second portion.

63. A resistance welding control system according to claim 62 wherein the connecting means includes a controlled rectifier means connected to the heat control means and is controlled by the heat control means, and in which the sensing means senses the voltage across the device and the signal is indicative of the termination of the flow of current through the load.

64. A resistance welding control system according to claim 63 wherein the controlled rectifier means is rendered conductive and non-conductive in periodic relation with the source, and furhter including means for transmitting the signal indicative of the power factor of the load to said heat control means when the controlled rectifier device becomes non-conductive.

65. A resistance welding control system according to claim 64 wherein the controlled rectifier means includes a pair of back-to-back connected controlled rectifier devices which are alternately conductive, said controlled rectifier devices being rendered conductive during alternate half-cycles of the source voltage with each becoming non-conductive before the other becomes conductive, and in which the signal indicative of the power factor of the load is transmitted when either of the controlled rectifier devices becomes non-conductive.

66. A resistance welding control system according to claim 65 wherein the sensing means includes a transformer connected across the devices.

67. A resistance welding control system according to claim 66 wherein the sensing transformer produces the signal, which signal changes with changes of the voltage across the devices, and the control means is controlled by the sensing transformer for actuating the rectifier devices during appropriate alternate half-cycles of the alternating voltage source.

68. A resistance welding control system according to claim 67 wberein the transformer has a primary winding connected across the devices, the transformer transmitting the signal each time that a conductive one of the devices becomes non-conductive.

69. A resistance welding control system according to claim 68 wherein control means actuates the devices by applying a pulse of electrical energy thereto, and in which the control means includes means for disabling the transmission of the pulse until the signal is received from the sensing means.

70. A resistance welding control system according to claim 69 wherein the control means includes timing means for delaying actuation of the devices in the first cycle for a selectable period.

71. A resistance welding control system according to claim 70 wherein the control means includes a capacitor, a capacitor charging circuit in which the capacitor is charged during one-half-cycle of the source voltage and a capacitor discharging circuit in which the capacitor is selectively discharged to produce actuation of one of the devices during the next half-cycle of the source voltage, and further including means connected to the discharge circuit for preventing discharge of the capacitor until the sensing means detects the voltage change across the devices.

72. A resistance welding control system according to claim 59 wherein the heat control means includes means for comparing the magnitude of the curve to a fixed level and generating an output signal when the magnitude of said curve bears a preselected relationship to said fixed level.

73. A resistance welding control system according to claim 72 wherein said heat control means includes means for sending the polairty of selected half-cycles of the alternating voltage and generating a signal indicative of the attainment of a selected relationship between the timing curve and the said fixed level and a preselected polarity.

74. A resistance welding control system according to claim 73 further including means connected to said connecting means for feeding said last-named signal to said connecting means for connecting the load to the source.

75. A resistance welding control system according to claim 74 wherein said last-named signal is a firing pulse for causing conduction of said connecting means connected between the source and the load so that the load is supplied with a preselected portion of the alternating voltage indicative of the percent heat.

76. A resistance welding control system according to claim 59 wherein the power factor sensing means includes means for sensing the zero voltage cross-over point and the zero current cross-over point.

77. A resistance welding control system according to claim 76 wherein said zero current cross-over point sensing means includes means for sensing the voltage across said connection means.

78. A resistance welding control system according to claim 77 wherein the connection means is rendered conductive and non-conductive in periodic relation with the source and in which the signal indicative of the power factor of the load is transmitted when the connection means becomes non-conductive.

79. A resistance welding control system according to claim 78 wherein the connection means is a pair of back-to-back connected controlled rectifier devices which are alternately conductive.

80. A resistance welding control system according to claim 79 wherein the controlled rectifier devices are rendered conductive during alternate half-cycles of the source voltage with each becoming non-conductive before the other becomes conductive, and including means for transmitting the signal indicative of the power factor of the load to the heat control means when either of the controlled rectifier devices becomes conductive.

81. A resistance welding control system according to claim 80 wherein the controllable rectifier devices conduct when actuated and continues to conduct until the current therethrough and through the load drops below a certain value, in which the voltage across the devices cannot change to the instant source voltage value until the conductive one of the rectifier devices becomes non-conductive and in which the sensing means includes means connected across the devices to detect the change in voltage across the devices.

82. A resistance welding control system according to claim 81 wherein the sensing means includes a transformer connected across the devices.

83. A resistance welding control system according to claim 72 wherein said second portion characteristic is a variable slope curve which is initiated in response to the sensing of the zero current point.

84. A resistance welding control system according to claim 83 wherein said curve generating means includes first and second RC timing networks including a resistor and capacitor means for said networks, said system including circuit means for providing a source of charging current for said capacitor means, one of said resistor and capacitor means of said timing networks being selectively variable to select the variable slope characteristic.

85. A resistance welding control system according to claim 84 wherein said first and second RC timing networks includes a common capacitor.

86. A resistance welding control system according to claim 84 further including bistable switching means for selectively connecting one of said RC timing networks to the source of charging current.

87. A resistance welding control system according to claim 86 wherein said bistable switching means is connected between said source of charging current and said timing networks and has a first and second state, said switching means being in said first state during the period between the sensing of said zero voltage cross-over point and said zero current crossover point.

88. A resistance welding control system according to claim 86 wherein said bistable switching means is switched to said second state in response to the sensing of said zero current cross-over point.

89. In a resistance welding control system including connecting means for selectively connecting a load having a power factor to a source of alternating voltage during each of at least certain of the half-cycles of the alternating voltage for each weld in accordance with a variably selectable percent heat, said alternating voltage having a characteristic that the current through the load lags the voltage and passes through a zero current point a period of time following the passage through zero of the voltage, said period of time defining the power factor of the load, said system including a sensing means for sensing the power factor of the load, and a curve generator, the method of controlling the connection of the load to the source including the steps of sensing the power factor of the load, generating a curve having a constant characteristic portion and a seocnd portion, terminating the first portion and initiating the generation of the second portion by the sensing means in response to the sensed power factor, altering a characteristic of said second portion for selecting the percent heat fed to the load, and controlling the connection means in response to the characteristics of said first and second portions to selectively connect the load to the source.

90. A method according to claim 89 including connecting the load to the source during each of a succession of half-cycles of the source and sensing the power factor of the load during each of a plurality of the half-cycles during a single weld.

91. A method according to claim 89 including producing a signal indicative of the power factor of the load, and in which the step of controlling the connection of the source and the load is responsive to the signal.

92. A method according to claim 89 wherein the succession of half-cycles includes half-cycles of both polarities and said second portion is a selectably variable slope curve and said altering a characteristic of the second portion step varies the slope of said second portion.

93. A method according to claim 92 wherein the signal is indicative of the termination of the flow of current through the load.

94. A method according to claim 93 wherein the connecting means includes controlled rectifier devices which conduct when actuated and continue to conduct until the current therethrough and through the load drops below a certain value, in which the voltage across the devices cannot change to the instant source voltage value until the conductive one of the rectifier devices becomes non-conductive, wherein the step of sensing the power factor of the load includes detecting the change in voltage across the devices.

95. A method according to claim 94 further including the steps of sensing the polarity of selected half-cycles of the alternating voltage, sensing the magnitude of the curve, comparing the magnitude of the curve to a fixed reference level and said sensed polarity and generating a further signal indicative of the attainment of a selected relationship between the curve and the said reference level and a preselected polarity.

96. A method according to claim 95 further including feeding said further signal to the connecting means and controlling the connecting means with the further signal to control connection of the load to the source.

97. A method according to claim 96 wherein said further signal is a firing pulse for causing conduction of the controlled rectifier devices connected between the source and the load so that the load is supplied with a preselected portion of the alternating voltage indicative of the percent heat.

98. A method according to claim 89 wherein the power factor sensing step includes sensing the zero voltage cross-over point and the zero current cross-over point.

99. A method according to claim 98 wherein the controlled rectifier devices are rendered conductive and nonconductive in periodic relation with the source, the method further including transmitting the signal indicative of the power factor of the load when one of the controlled devices becomes non-conductive.

100. A method according to claim 98 further including initiating said constant characteristic portion in response to the sensing of the zero voltage point.

101. A method according to claim 100 wherein said second portion has a variable slope, the method further including initiating said variable slope portion in response to the sensing of said zero current point.

102. A method according to claim 101 further including actuating the controlled devices by applying a pulse of electrical energy thereto, and disabling the transmission of the pulse until the further signal is received.

103. A resistance welding system including a source of alternating voltage, a welding load and controlled switch means connected between the source and the welding load for controlling the application of the source to the load in accordance with a desired percent heat, said load having reactance so that a power factor angle exists between the load voltage and load current, the improvement comprising a control system connected to the controlled switch means for controlling the conduction of the controlled switch means for controlling the phase angle of the alternating source at which selected halfcycles are applied to the load in response to the power factor angle and the desired percent heat, said control system including sensing means for sensing the zero cross-over point of the load current and producing a sensing signal in response to said sensed zero point, timing circuit means connected to said sensing means for generating a curve having a first and second portion, said first portion being generated prior to the generation of said sensing signal, said second portion being generated in response to the generation of said sensing signal, and firing circuit means connected to said switch means and said timing circuit means for operating said switch means in response to a characteristic of said second portion.

104. The improvement of claim 103 wherein said timing circuit means includes a chargeable device, said timing circuit means including charging circuit means for providing a preliminary charge on said charging device during the period of said first portion.

105. The improvement of claim 104 wherein said firing circuit means includes means establishing a reference level, said second portion characteristic being the magnitude of said curve, said firing circuit means including means actuating said controlled switch means when said curve magnitude bears a preselected relationship to said reference level.

106. The improvement of claim 105 wherein said firing circuit means includes comparator means connected to said curve generating means and said reference level producing means, said comparator means sensing the occurrence of said preselected relationship and generating a control signal in response to said occurrence of said relationship.

107. The improvement of claim 106 wherein said controlled switch means includes a pair of back-to-back connected controlled rectifier devices, said firing circuit means firing one of said controlled rectifier devices in response to the sensing of said preselected relationship.

108. The improvement of claim 107 wherein said comparator means includes a programmable unijunction transistor having at least first and second electrodes, said first electrodes of said transistor being interconnected with said chargeable device and said second electrode being connected to said reference level producing means for controlling the conduction of said unijunction transistor when signals from said chargeable device and said reference level producing means achieve said preselected relationship.

109. The improvement of claim 108 further including means for varying said reference level producing means.

110. The improvement of claim 104 wherein said timing circuit means includes first and second charging circuit means connected to said chargeable device for creating said first and second portions, respectively, circuit means connected to said sensing means for switching the energization of said chargeable device from said first charging circuit to said second charging circuit in response to said sensing signal.

111. The improvement of claim 110 wherein said first charging circuit includes rectifier means to permit current flow therethrough in one direction, the operation of said switching circuit means in response to said sensing signal back-biasing said rectifier means to disable said first charging circuit.

112. The improvement of claim 111 wherein said switching circuit means includes a pair of interconnected transistor devices.

113. The improvement of claim 112 wherein said controllable switch means includes controlled rectifier means, said sensing means including a transformer having a winding connected to said controlled rectifier means to sense a conductive condition of said control rectifier means.

114. The improvement of claim 113 wherein said controlled rectifier means includes a pair of back-to-back connected controlled rectifier devices, said transformer being connected across corresponding electrodes of said rectifier devices.

115. The improvement of claim 103 wherein said switch means includes controlled rectifier means, said sensing means including a transformer having a winding connected to said controlled rectifier means to sense a conductive condition of said control rectifier means.

116. The improvement of claim 115 wherein said controlled rectifier means includes a pair of back-to-back connected controlled rectifier devices, said transformer being connected across corresponding electrodes of said rectifier devices.

117. In a resistance welding system including a source of alternating voltage, a welding load, controlled switch means connected between the source and the welding load for controlling the application of the source to the load in accordance with a desired percent heat, the load having reactance so that a power factor angle exists between the load voltage and load current, and a control system connected to the controllable switch means, a method of controlling the conduction of the controlled switch means for controlling the phase angle of the alternating source at which selected half-cycles are applied to the load by controlling the actuation of the controllable switch means in response to the power factor angle and the desired percent heat comprising the steps of sensing the zero cross-over point of the load current, producing a sensing signal in response to said sensed zero point, generating a curve having a first and second portion, said first portion being generated prior to the generation of said sensing signal, said second portion being generated in response to the generation of said sensing signal, and operating said switch means in response to a characteristic of said second portion.

118. The method of claim 117 wherein said curve is generated by charging a chargeable device, said first portion providing a preliminary charge on said charging device.

119. The method of claim 118 further including the steps of establishing a reference level, said second portion characteristic being the magnitude of said curve, and operating said controllable switch means when said curve magnitude bears a preselected relationship to said reference level.

* * * * *